(12) United States Patent
Ranalli et al.

(10) Patent No.: US 11,509,200 B2
(45) Date of Patent: Nov. 22, 2022

(54) PROCESS FOR MAKING A CONTINUOUS BAR WINDING FOR AN ELECTRIC MACHINE

(71) Applicant: TECNOMATIC SPA, Corropoli (IT)

(72) Inventors: Giuseppe Ranalli, Corropoli (IT);
Maurilio Micucci, Corropoli (IT);
Giovanni Ruggieri, Corropoli (IT)

(73) Assignee: TECNOMATIC SPA

( * ) Notice: Subject to any disclaimer, the term of this patent is extended or adjusted under 35 U.S.C. 154(b) by 292 days.

(21) Appl. No.: 16/957,512

(22) PCT Filed: Dec. 27, 2018

(86) PCT No.: PCT/IB2018/060644
§ 371 (c)(1),
(2) Date: Jun. 24, 2020

(87) PCT Pub. No.: WO2019/130232
PCT Pub. Date: Jul. 4, 2019

(65) Prior Publication Data
US 2021/0376698 A1    Dec. 2, 2021

(30) Foreign Application Priority Data

Dec. 29, 2017 (IT) .......................... 102017000151114

(51) Int. Cl.
*H02K 15/06* (2006.01)
*H02K 1/16* (2006.01)
*H02K 3/50* (2006.01)

(52) U.S. Cl.
CPC ............. *H02K 15/063* (2013.01); *H02K 1/16* (2013.01); *H02K 3/505* (2013.01)

(58) Field of Classification Search
CPC . H02K 15/04; H02K 15/0414; H02K 15/0421
(Continued)

(56) References Cited

U.S. PATENT DOCUMENTS 6,657,352 B1 * 12/2003 Asao ...................... H02K 1/165
                                                            310/180
10,797,550 B2 * 10/2020 Saito ........................ H02K 3/28
(Continued)

OTHER PUBLICATIONS

International Search Report, issued in PCT/IB2018/060644, completed Mar. 26, 2019, Rijswijk, Netherlands.
(Continued)

*Primary Examiner* — Quyen P Leung
*Assistant Examiner* — Minki Chang
(74) *Attorney, Agent, or Firm* — Valauskas Corder LLC

(57) ABSTRACT

A process for making a continuous bar winding (4) for an electric machine is described, comprising: a) a step of providing a template (10) having a template axis (X) and a circular array of slots (11) extended about said template axis (X), said circular array of slots having a number of slots equal to a number of slots of the stator or of the rotor of said electric machine, each slot (11) of said circular array having a first and a second open end face (11A, 11B) which are axially spaced from one another and a third open end face (11C), said third face (11C) being a longitudinal face extended between said first and second end faces (11A, 11B) b) a step of providing a conductive bar (20); c) a step of locking a locking portion (21) of said conductive bar; d) a step of inserting the conductive bar (20) into the slots (11) of said array and shaping the conductive bar (20) so that such conductive bar (20) repeatedly passes through the slots (11) of said array from the side of the first open end faces (11A) to the side of the second open end faces (11B) and vice versa, so that said bar (20) has a plurality of bar portions (20B, 20E, 20H) received in the slots (11) of said array and a plurality of connecting portions (20C, 20D; 20F, 20G) projecting beyond said first and second open end faces (11A, 11B), each of said connecting portions joining a pair of said bar portions (20B, 20E, 20H) received in the slots (11) of
(Continued)

said array; in which said step d) comprises: d1) an operation of inserting a first bar portion (20B) of said plurality of bar portions into a respective slot (11) of said circular array of slots (11) through said third face (11C) of such slot (11); d2) an operation of shaping a first connecting portion (20C, 20D) of said plurality of connecting portions (20C, 20D; 20F, 20G); d3) an operation of inserting a second bar portion (20E) of said plurality of bar portions (20B, 20E, 20H) into a further slot (11) of said array, different from the slot (11) into which said first bar portion (20B) has been inserted, through said third face (11C) of the further slot (11); in which said first connecting portion (20C, 20D) joins said first and second bar portions (20B, 20E) projecting beyond the second end faces (11B) of the slots (11) in which said first and second bar portions (20B, 20E) have been inserted.

22 Claims, 21 Drawing Sheets

(58) Field of Classification Search
USPC .......................................................... 29/596
See application file for complete search history.

(56) References Cited

U.S. PATENT DOCUMENTS

| 2004/0207282 | A1 | 10/2004 | Ueda |
| 2009/0096311 | A1 | 4/2009 | Even |
| 2010/0259124 | A1 | 10/2010 | Bodin |

OTHER PUBLICATIONS

International Preliminary Report on Patentability, issued in PCT/IB2018/060644, completed Mar. 17, 2020, Rijswijk, Netherlands.

* cited by examiner

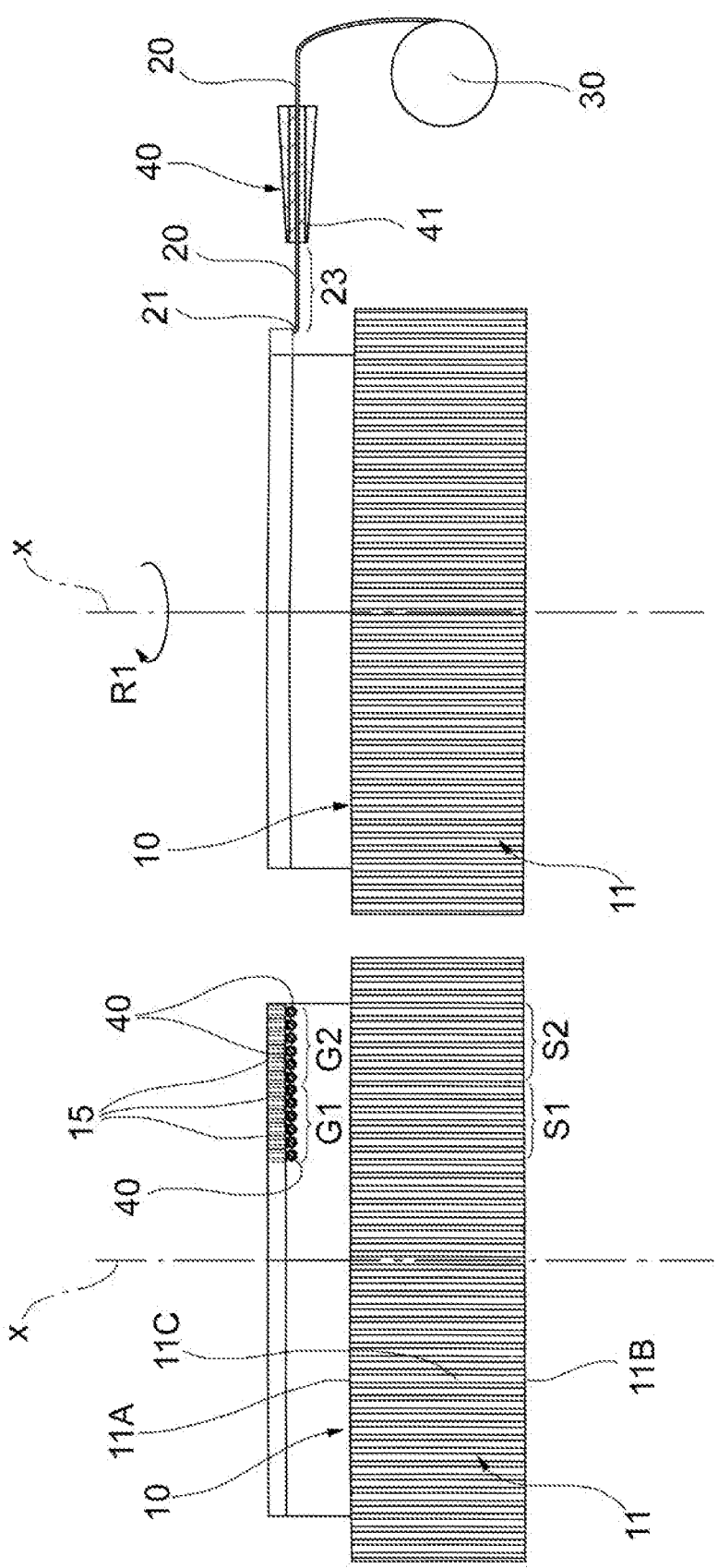

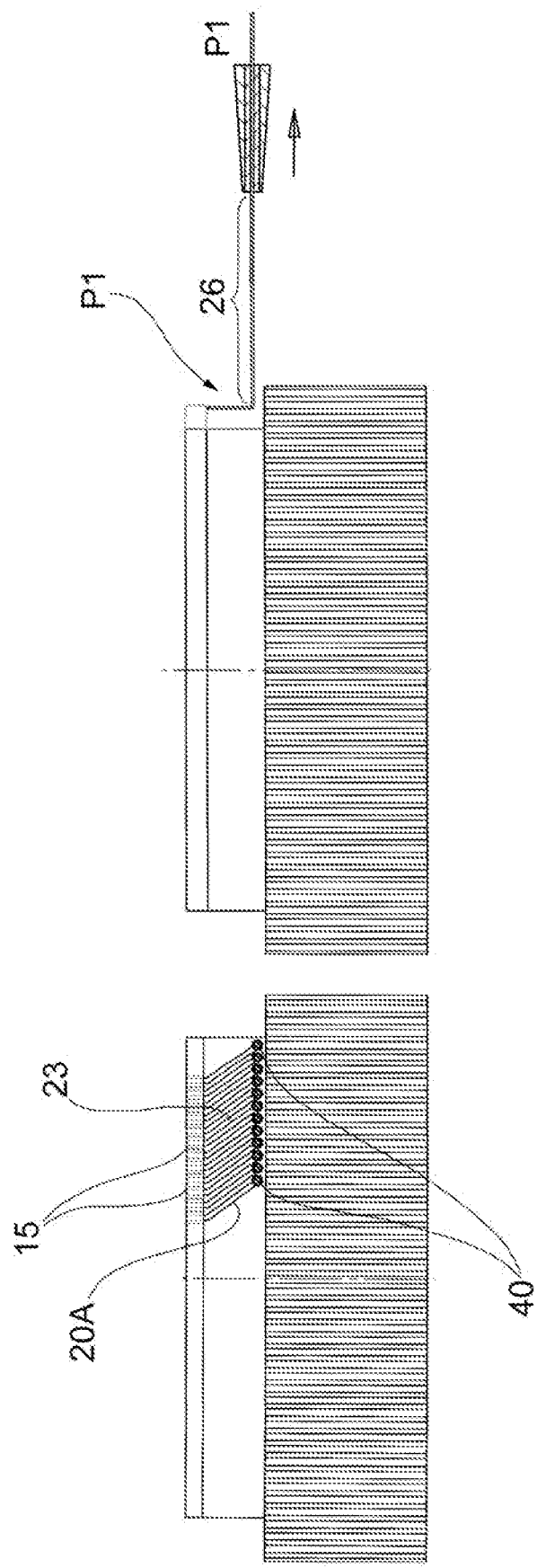

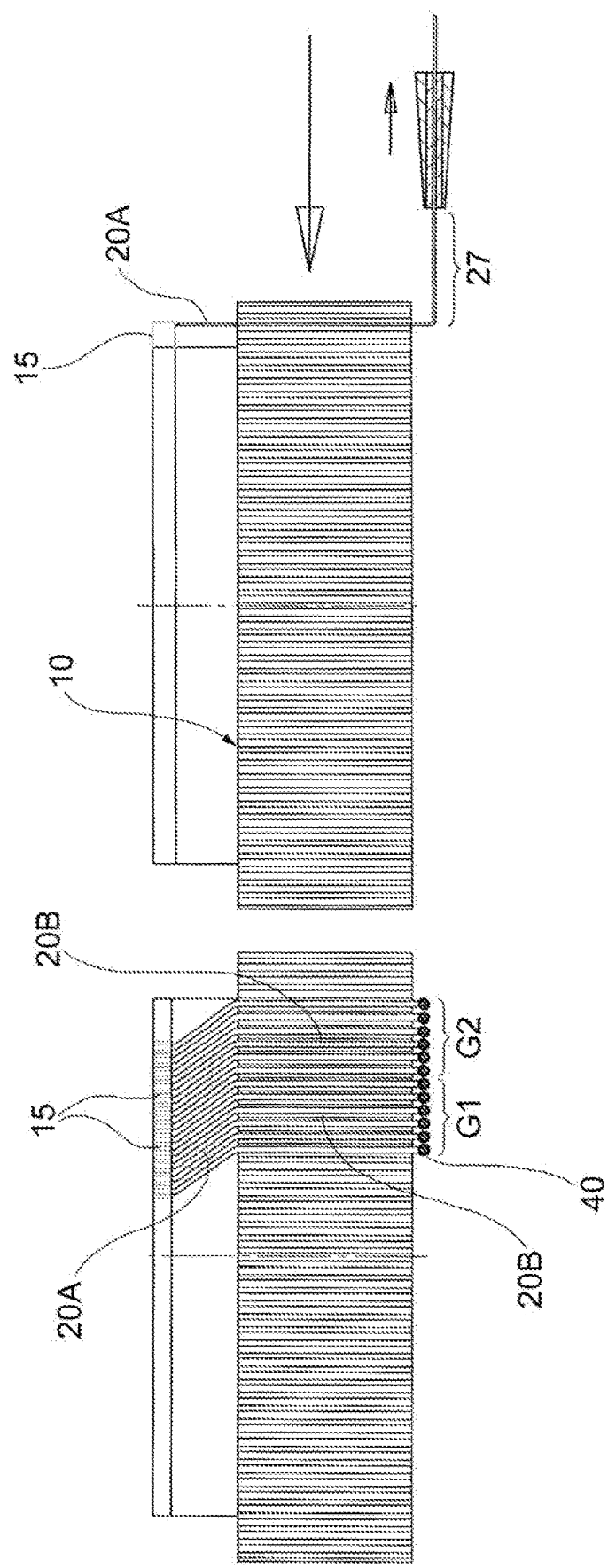

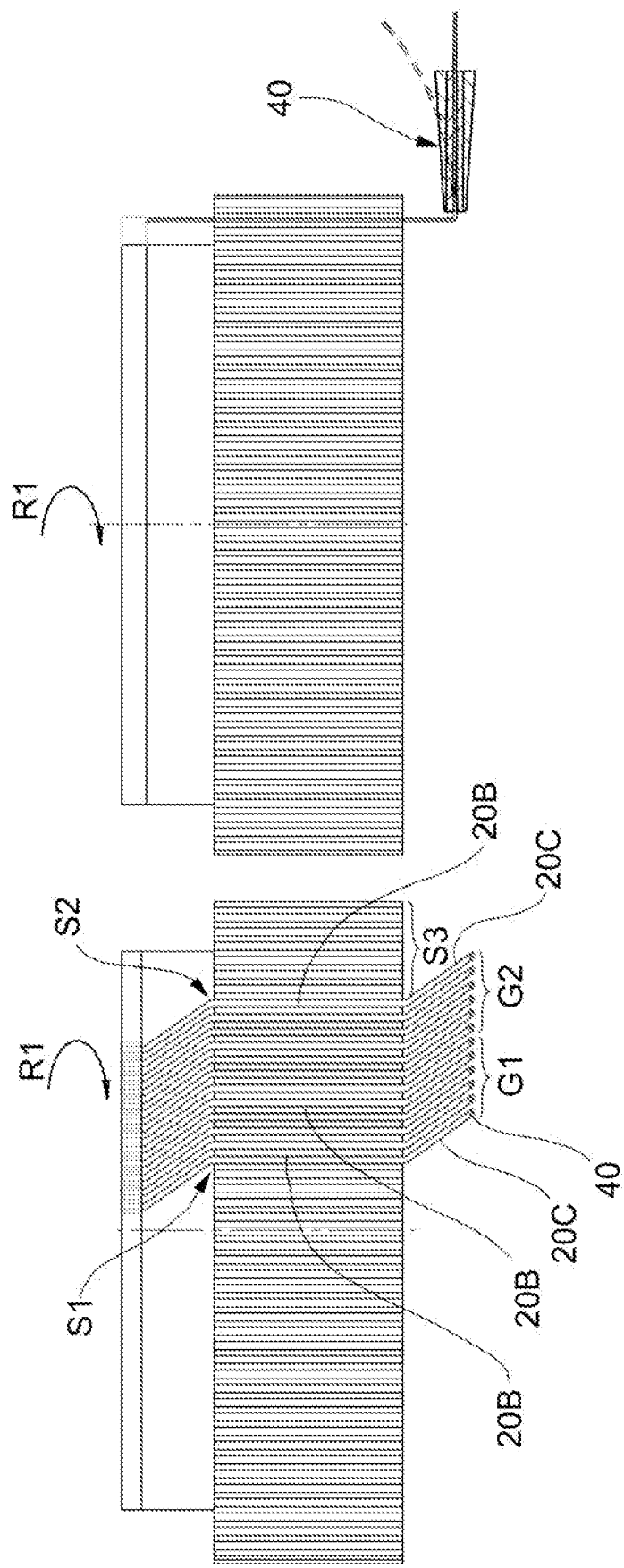

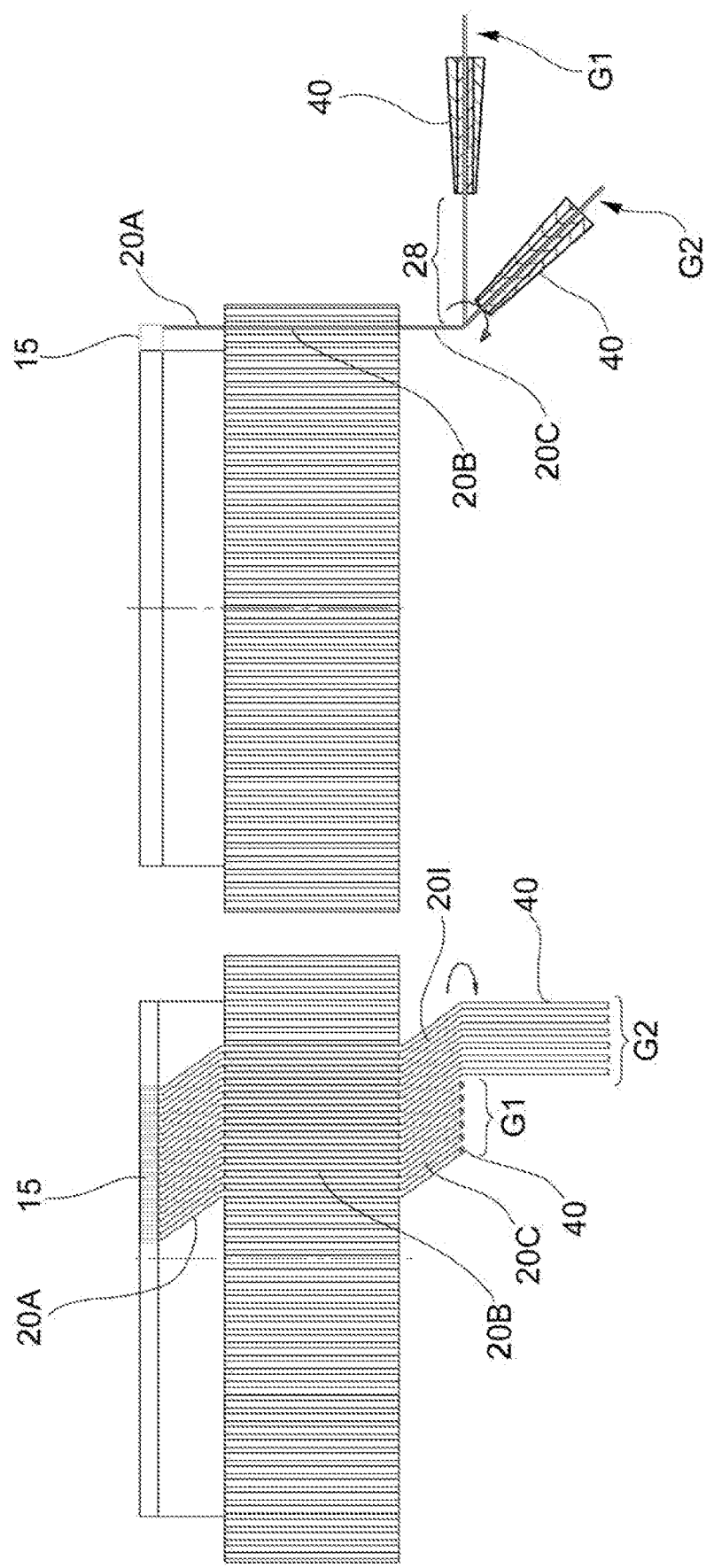

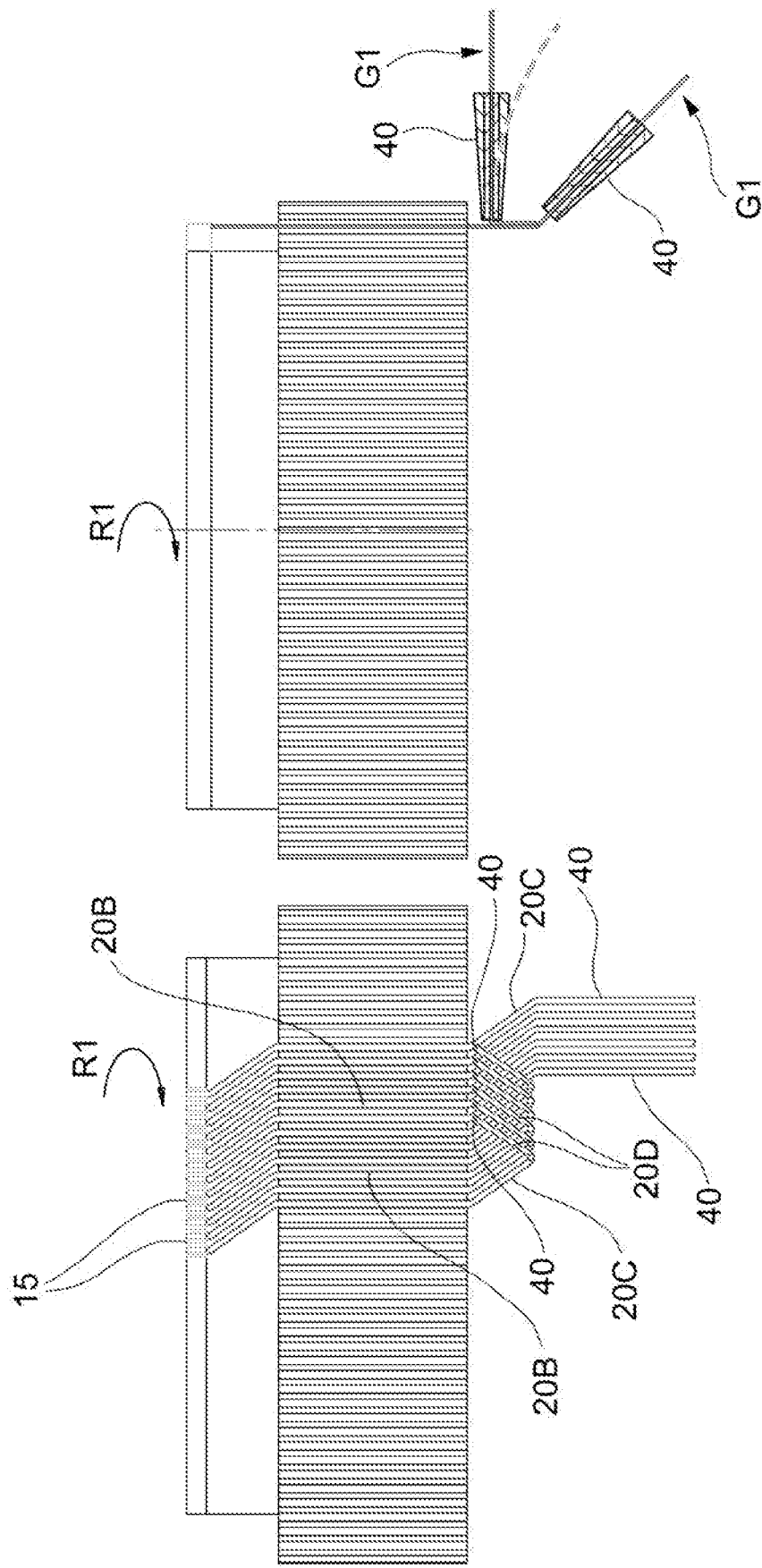

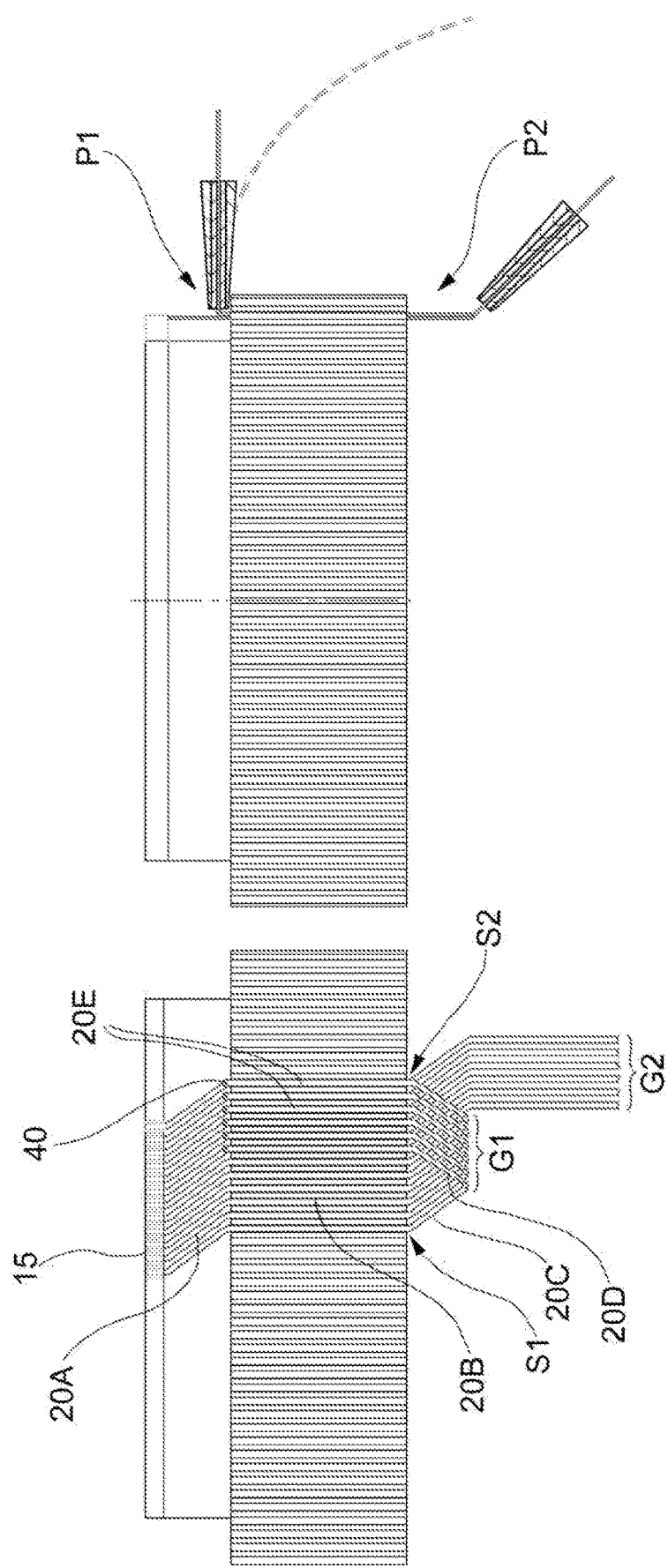

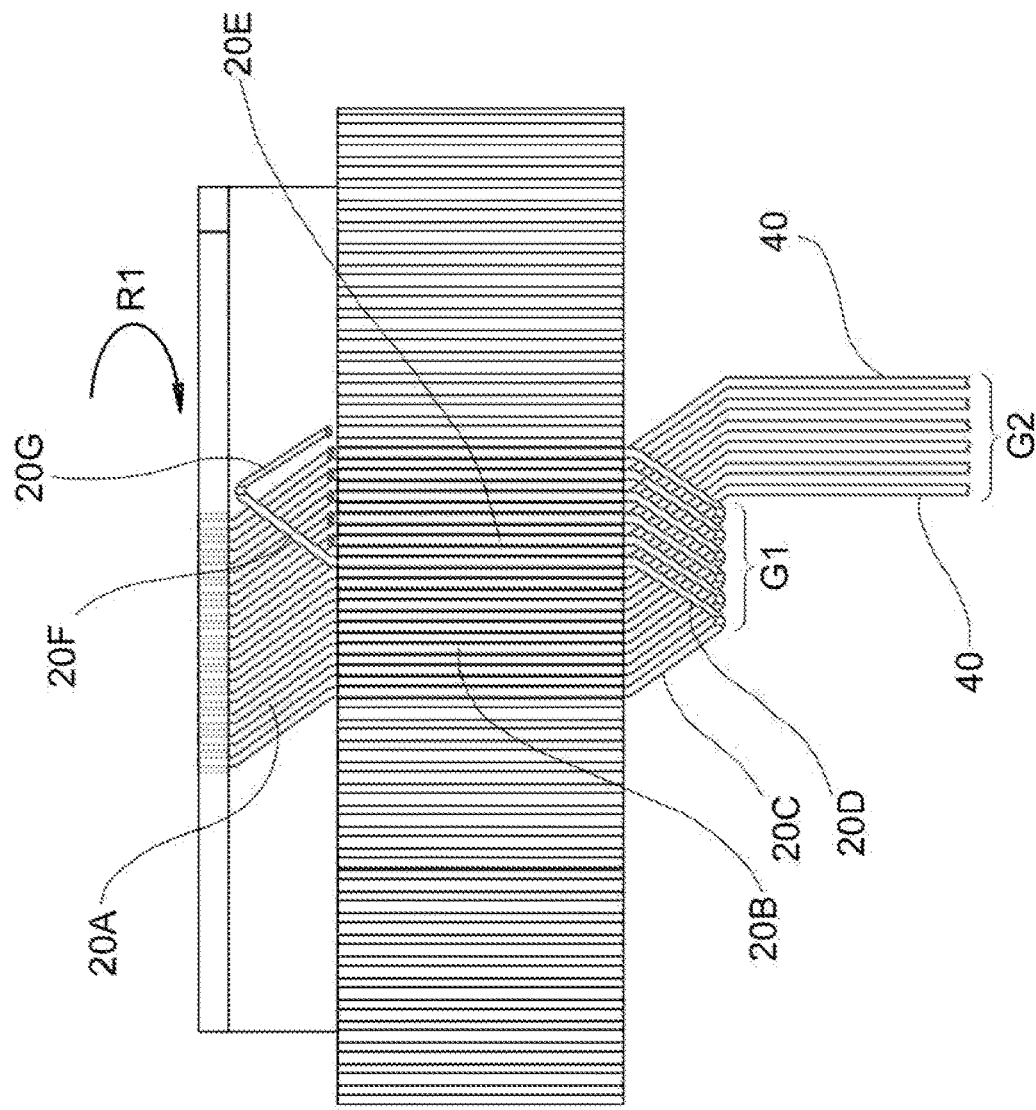

PROCESS FOR MAKING A CONTINUOUS BAR WINDING FOR AN ELECTRIC MACHINE

The present invention relates to the technical field of electric machines with bar windings and, more in particular, it relates to a process for making a continuous bar winding for a stator or a rotor of an electric machine.

With reference, for example, and not by way of limitation, to the stators of electric machines, such as generators or electric motors, for example for applications in hybrid electric vehicles (HEVs), is known making stators in which the stator winding is formed by a plurality of electrically conductive bars, which are folded and variously interconnected to one another so as to form so-called bar windings.

In particular, the background art includes bar windings produced by means of conductive bars having a rectangular cross section, where rectangular means both the square section and the "plane" section which generally indicates a rectangular section in which two sides of the section are smaller than the other two.

One method of the background art for making stators with bar windings is based on the employment of conductive bars usually preformed, starting from straight bars, by means of "U" or "P" bendings. U.S. Pat. No. 7,480,987 describes an example of a method for preforming conductive bars (referred to, in such document, as "hairpin conductors").

The "U" or "P" preformed conductive bars conventionally have two adjacent arms of different length, each having an end portion connected, by means of a connecting portion, to the other of the two arms and an opposite free end portion. In particular, for example, subjecting the "U" or "P" preformed conductive bars to a first type of twisting, essentially adapted to "open up" the arms of each bar, inserting the conductors which have been subjected to the first type of twisting into the slots of a stator core, subjecting the free ends of the conductors to a second type of twisting and subsequently welding the free ends of the conductive bars so as to realize the suitable electrical connections between the conductive bars forming the winding, is known for making a stator. A stator with a bar winding obtained starting from "P" or "U" pre-shaped bars of the aforesaid type is described, for example, in U.S. Pat. No. 8,922,078.

A disadvantage of the stators with bar windings made in the manner described above, starting from "P" or "U" pre-shaped bars, is given by the fact that numerous and expensive weldings as well as relatively complex processes, such as, for example, welding side twisting, are required to realize the appropriate electrical connections between the conductors.

A further method of the background art for making stators with bar windings is based on the employment of continuous conductive bars, sometimes also called "continuous conductors". In practice, each of such bars is shaped so as to repeatedly pass through the stator core from a first to a second side and vice versa. The windings with continuous conductive bars have the advantage of requiring a significantly lower number of weldings for making the electrical connections between the various bars which form the winding with respect to the bar windings obtained starting from the aforesaid "P" or "U" preformed conductors.

With regard to the stators with continuous conductive bar windings, pre-shaping on a plane surface each conductive bar of the winding by means of pairs of complementary molds is particularly known, so as to have a generally wavy planar shape. The pre-shaped bars thus obtained are then folded on themselves so as to assume a circular configuration and are subsequently inserted into the slots of a stator core. In particular, for example, inserting such pre-shaped bars into a particular, specifically designed "segmented" stator core, consisting of a plurality of stator core segments interconnected with one another, is known. Inserting the aforesaid pre-shaped continuous conductive bars into a "flexible" stator core is also known. US Patent Application published under No. US 2014/0292123 describes a method for inserting suitably shaped continuous conductive bars into a flexible stator core of the aforesaid type.

The processes of the background art described above for making stators with continuous conductive bar windings, which require the employment of a segmented stator core or the employment of a flexible stator core, have some drawbacks. For example, such processes have the disadvantage of not allowing to make in a versatile manner types of windings different from one another, as this requires, for example, different molds be provided, depending on the particular type of winding to be made. Furthermore, such processes have the disadvantage of allowing only laminated windings to be made, in which each phase always lies on the same crown and therefore does not allow to make some types of windings with particular arrangements of the conductive bars in the slots of the stator core. Also, such processes have a drawback due to the fact that the "flexible" stator core and the "segmented" stator core of the aforementioned type have disadvantages from an electromagnetic point of view.

It is a general object of the present invention to provide a process for making a continuous bar winding for a stator or for a rotor of an electric machine which allows, at least partially, to overcome the drawbacks described above with reference to the background art.

According to an aspect of the present invention, in addition or alternatively to the aforesaid object, it is an object of the present invention to provide a process for making a continuous bar winding for a stator or for a rotor of an electric machine, which allows to make, in a versatile manner, types of windings which are different from one another.

According to an aspect of the present invention, in addition or alternatively to the aforesaid object, it is an object of the present invention to provide a process for making a continuous bar winding for a stator or for a rotor of an electric machine of a type alternative with respect to the processes of the background art.

These and other objects are accomplished by means of a process as defined in the appended claim 1 in the more general embodiment thereof, and in the claims dependent thereon in some particular embodiments.

The invention will become more apparent from the following detailed description of the embodiments thereof, made by way of explanation and, therefore, by no means, by way of limitation, in relation to the accompanying drawings, in which:

FIGS. 2, 4, 6, 8, 10, 12, 14, 16 and 18 are front and diagrammatic plane views showing some steps of a process in accordance with a preferred embodiment for making the bar winding of FIG. 1;

FIGS. 3, 5, 7, 9, 11, 13, 15, 17, 19 are side and diagrammatic plane views showing the steps shown in FIGS. 2, 4, 6, 8, 10, 12, 14, 16 and 18, respectively, from a different angle;

FIGS. 20-29 are front and diagrammatic plane views showing further steps of the aforesaid process for making the bar winding of FIG. 1;

In the accompanying Figures, the same or similar elements will be indicated with the same reference numerals.

In the following description, the terms "internal", "external", "radial", "circumferential", "axial" and variants of such terms, i.e., terms derived therefrom or similar thereto, such as, for example, and not by way of limitation, "externally" or "circumferentially", refer to the axis X which will be described further on.

Figure 1:
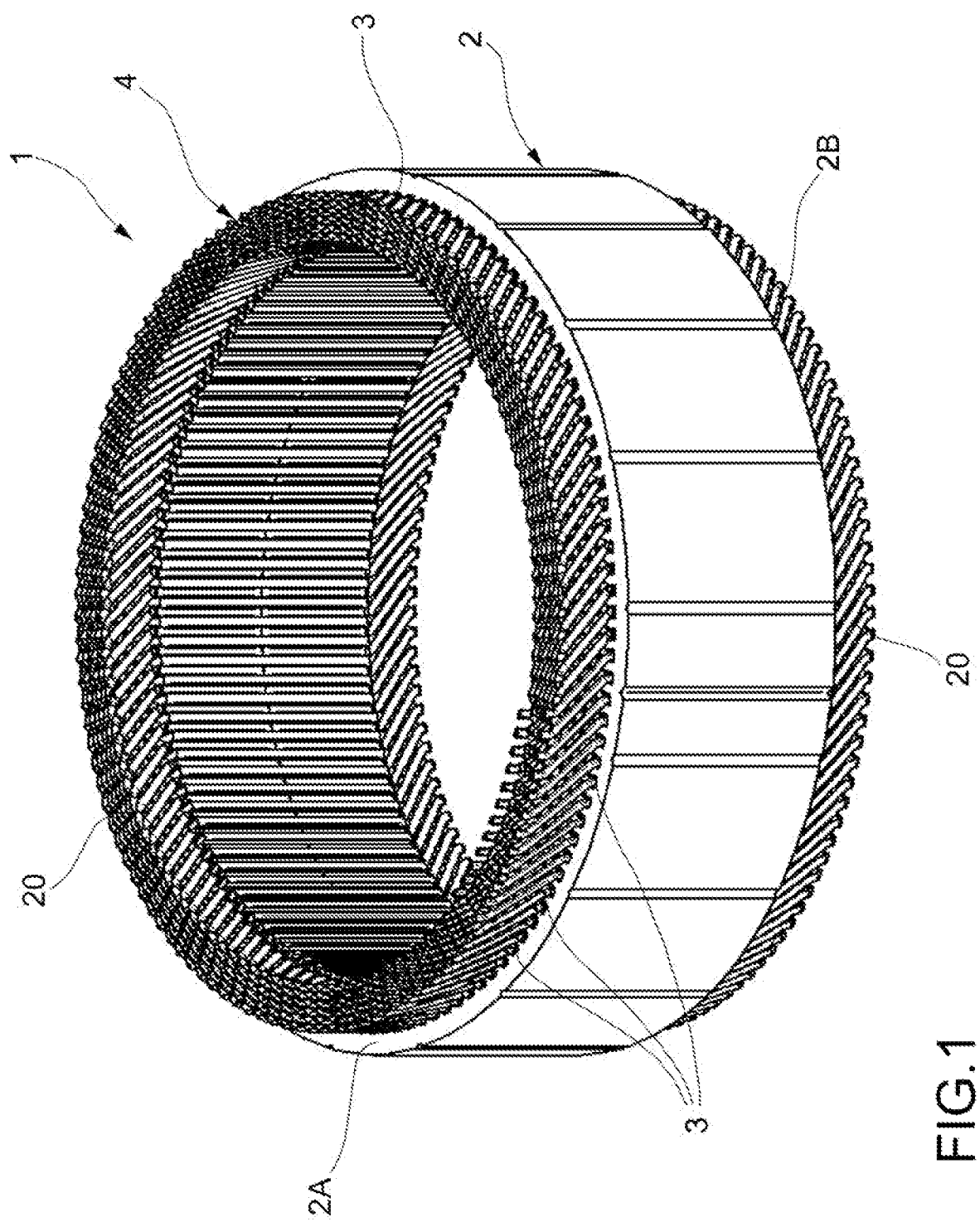
FIG. 1 shows a perspective view of a stator for an electric machine provided with a bar winding.

With reference, initially, to FIG. 1, in such Figure a stator for an electric machine in accordance with a preferred embodiment has been indicated globally with reference numeral 1. The stator 1 comprises a stator core 2 provided with a plurality of stator slots 3 extending between a first end face 2A and a second end face 2B of the stator core 2, opposite to each other. In the example, the stator core 2 comprises, not by way of limitation, 120 stator slots 3. The stator 1 comprises an electric bar winding 4 in accordance with a preferred embodiment extending at least partially through the slots 3 of the stator core 2. In particular, the winding 4 is formed by a plurality of electrically conductive bars 20 which are shaped so that each of such bars 20 repeatedly passes through the slots 3 of the stator core 2 from the side of the first end face 2A to the side of the second end face 2B and vice versa. The bars 20 are continuous conductive bars, i.e., bars without weldings. In accordance with a preferred embodiment, the bars 20 are rectangular bar conductors, i.e., bar conductors having a rectangular or substantially rectangular cross section. The term "rectangular" means both a "plane" section, i.e., a rectangular section in which two opposed side of the rectangular are greater than the other two opposed side, as well as the square section. The term "substantially rectangular" means a section which is not perfectly rectangular or not perfectly square, such as, for example, and not by way of limitation, a generally rectangular or generally square section having rounded corners, for example, a generally rectangular or generally square section obtained by pressing or working in another manner a round wire conductor, i.e., a conductor having a circular cross section.

With reference now to FIGS. 2-29, a process in accordance with a preferred embodiment for making the winding 4 is now described. FIG. 2 shows a template 10 having a template axis X and a circular array of slots 11 extended about the template axis X. The axis X is, in particular, a central axis of the template 10. It should be noted that the template 10 has, in reality, a generally cylindrical shape, while in the accompanying diagrammatic Figures the template 10 is shown developed on a plane. The circular array of slots 11 has a number of slots 11 equal to the number of slots 3 of the stator 1 in which the winding 4 is intended to be arranged. Each slot 11 of the circular array of slots 11 has a first and a second open end face 11A, 11B, which are axially spaced from one another, and a third open end face 11C. In particular, the third open end face 11C is a longitudinal face extended between the first end face 11A and the second end face 11B.

In accordance with an embodiment, as in the example, the faces 11C are faces open towards the outside.

In accordance with a preferred embodiment, the template 10 is configured so as to rotate about the axis X.

With reference to FIGS. 2-3 an initial step of the process in accordance with an embodiment is shown. In particular, a plurality of conductive bars 20 are provided; in the example, not by way of limitation, twelve bars 20. In accordance with an embodiment, in particular, two bars 20 are provided for each phase of the winding 4. In accordance with a preferred embodiment, the bars 20 are provided with an electrically insulating coating, such as, for example, an insulating enamel. Each bar 20 is locked at a respective bar locking portion 21. Preferably, the portions 21 are end portions 21 of the bars 20. Preferably, the bars 20 are locked by means of at least one locking device 15 and, more preferably, the portion 21 of each bar 20 is locked by means of a respective locking device 15. In accordance with an embodiment, the locking devices 15 are rotatably integral with the template 10 about the axis X. In accordance with an embodiment, each bar 20 is wound around a respective winding device 30, such as, for example, a winding spool 30 of the type per se known and configured to allow the bar 20 to be unwound from such device 30 when required by the process.

In accordance with a preferred embodiment, the circular array of slots 11 comprises a first, a second, and a third group of slots S1, S2, S3 (FIG. 3 and FIG. 11) which are distinct from and circumferentially adjacent to one another and which respectively comprise a plurality of first, second and third slots 11. Each of such groups S1, S2, S3 of slots comprises a same number of slots which are circumferentially adjacent to one another. In the example in which twelve bars 20 are provided, each group S1, S2, S3 of slots has in particular six slots 11. In accordance with an embodiment, the aforesaid plurality of conductive bars 20 comprises a first and a second group of bars G1, G2 having each a number of conductive bars equal to the number of slots 11 of the groups S1, S2 and S3. Therefore, in the example in which twelve bars 20 are provided and in which the groups S1, S2, S3 have each six slots 11, the groups G1 and G2 have each six bars 20.

In accordance with an embodiment, each bar 20 is associated with a wire-guiding device 40, or a wire-guiding shuttle 40, which is preferably moved by a respective movement system. In particular, in accordance with an embodiment, a plurality of wire-guiding devices 40, which can be operated independently from one another, is provided, where each of such wire-guiding devices 40 is coupled to a respective conductive bar 20 of the aforesaid plurality of conductive bars 20. In the example in which twelve bars 20 are provided, twelve wire-guiding devices 40 are therefore provided. In accordance with an embodiment, each wire-guiding device 40 is operatively interposed between the template 10 and the winding device 30 on which the bar 20 associated with such wire-guiding device 40 is wound. Each wire-guiding device 40 is coupled to the respective conductive bar 20 so that a relative movement between the wire-guiding device 40 and the conductive bar 40 is allowed. Each wire-guiding device 40 is equipped with a plurality of degrees of freedom. In accordance with a preferred embodiment, each wire-guiding device 40 is equipped with 6 degrees of freedom, i.e., three translations along a set of three orthogonal axes and three rotations about such axes. In accordance with a preferred embodiment, one of such axes is an axis parallel to the axis X. As will be better understood further on, the wire-guiding devices 40 are employed at least to guide the insertion of a plurality of bar portions 20B, 20E, 20H (FIG. 22) of each bar 20 in the slots 11 of said array. In accordance with a preferred embodiment, the wire-guiding devices 40 are employed both to guide the insertion of the aforesaid bar portions 20B, 20E, 20H into the slots 11 and to shape a plurality of connecting portions 20C, 20D; 20F, 20G; (FIG. 24) of the bars 20. The connecting portions 20C, 20D and 20F, 20G project beyond the first and second open end faces 11A, 11B. Each connecting portion 20C, 20D and 20F, 20G joins a pair of bar portions 20B, 20E, 20H received into the slots 11 of the aforesaid array.

In accordance with a preferred embodiment, each wire-guiding device 40 is slidably coupled to the respective bar 20. In accordance with an embodiment, each wire-guiding device 40 is movable with respect to the respective conductive bar 40 to define a plurality of conductive bar segments 23, 26, 27, 28, 29 to be processed. In accordance with an embodiment, each wire-guiding device 40 comprises a cavity 41 which is countershaped or substantially countershaped with respect to the respective conductive bar 20. In other words, if the conductive bar 20 is a rectangular bar conductor, also the cavity 41 will have a rectangular or substantially rectangular section. In particular, such cavity 41 is traversed by the conductive bar 20.

Again with reference to FIGS. 2-3, such Figures show an initial step of the process in accordance with an embodiment for making the winding 4. In particular, FIGS. 2-3 show an operation of positioning each wire-guiding device 40 along the respective bar 20 so as to define a first initial bar segment 23 which extends between the wire-guiding device 40 and the template 10. In general, from now onwards, in the present description, an operation of defining a bar segment to be processed of a bar 20, such as, for example, segment 23, may also be referred to as an operation of "feeding" a segment of a bar 20 or an operation of feeding the bar 20. In other words, all wire-guiding devices 40 coupled to the bars 20 of the groups G1 and G2 are positioned, preferably by simultaneously moving all the wire-guiding devices 40, each along the respective bar 20 so as to define or feed a plurality of first bar segments 23. In particular, in the example, twelve bar segments 23 are defined. In accordance with an embodiment, the segments 23 are straight segments, i.e., without bends. In accordance with an embodiment, during the operation shown in FIGS. 2-3 of positioning the wire-guiding devices 40, the template 10 remains still, i.e., it does not rotate about the axis X.

Starting from the configuration of FIG. 3, a plurality of initial portions 20A (FIG. 4) of the bars 20 are shaped, in the example, twelve portions 20A. In accordance with an embodiment, to shape such initial portions 20A, the template 10, together with the locking devices 15 integral therewith, is rotated in a first direction R1 about the axis X and the wire-guiding devices 40 are moved, preferably all synchronously, so that each of the wire-guiding devices 40 has a movement interpolated with the rotation movement of the template 10.

With reference to FIGS. 4-5, such Figures show an operation immediately following the shaping of the initial portions 20A. In particular, FIGS. 4-5 show an operation of positioning each wire-guiding device 40 along the respective bar 20 so as to define or feed a second bar segment 26 which extends between the wire-guiding device 40 and the template 10. In other words, all the wire-guiding devices 40 coupled to the bars 20 of the groups G1 and G2 are positioned, preferably by simultaneously moving all the wire-guiding devices 40, each along the respective bar 20 so as to define a plurality of second bar segments 26. In particular, in the example, twelve bar segments 26 are defined. In accordance with an embodiment, the segments 26 are straight segments, i.e., without bends. In accordance with an embodiment, during the operation shown in FIGS. 4-5 of positioning the wire-guiding devices 40, the template 10 remains still, i.e., it does not rotate about the axis X.

Figures 6, 7:
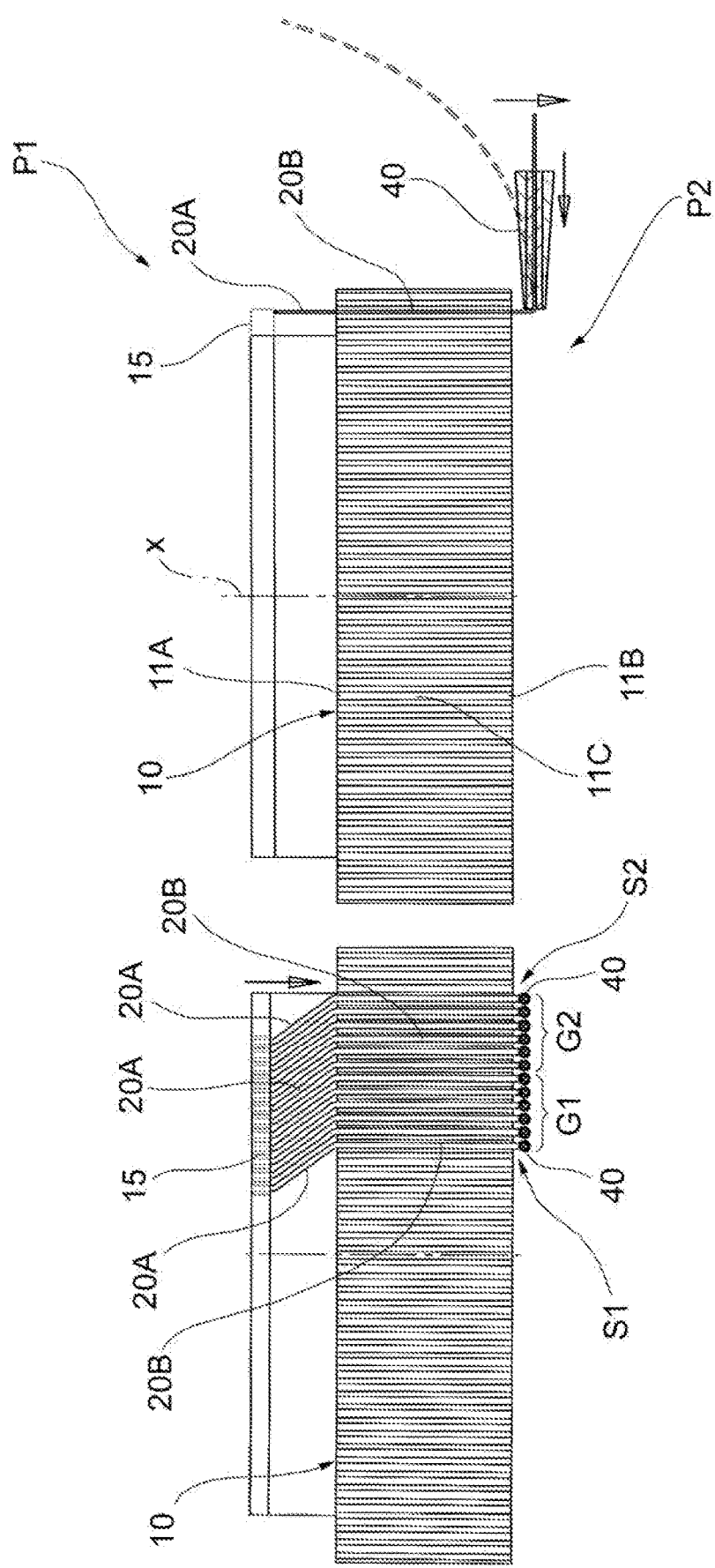

With reference to FIGS. 6-7, such Figures show an operation immediately following the definition of the second segments 26A. In particular, FIGS. 6-7 show an operation of:

inserting the first bar portions 20B of the first group G1 of bars each into a respective first slot 11 of the first group of slots S1 by means of the third open faces 11C of such slots 11; and inserting the first bar portions 20B of the second group G2 of bars each into a respective second slot 11 of the second group of slots S2 by means of the third open faces 11C of such slots 11. In accordance with an embodiment, such operation of inserting the first bar portions 20B of the first and of the second group of bars G1, G2 into the slots of the first and of the second group of slots S1, S2 is performed by simultaneously inserting such first bar portions 20B into the slots of the first and of the second group of slots S1, S2. In accordance with an embodiment, for performing such operation, the wire-guiding devices 40 pass from a position located on a side P1 (FIG. 5) of the template 10, axially beyond the first open end faces 11A of the slots 11, to a position located on a side P2 of the template 10, axially beyond the second open end faces 11B of the slots 11 (FIG. 7). The side P1 of the template 10 corresponds to the side of the first open end faces 11A of the slots 11 while the side P2, opposite to the side P1, corresponds to the side of the second open end faces 11B of the slots 11. In accordance with an embodiment, during such insertion operation, the wire-guiding devices 40 move integrally with the respective conductive bars 20. In other words, during such insertion operation no relative sliding is there between the wire-guiding devices 40 and the respective conductive bars 20. In accordance with an embodiment, during such insertion operation, the template 10 remains still, i.e., it does not rotate about the axis X.

With reference to FIGS. 8-9, such Figures show an operation immediately following the operation of insertion of the portions 20B described above. In particular, starting from the configuration of FIG. 7, FIGS. 8-9 show an operation of positioning each wire-guiding device 40 along the respective bar 20 so as to define or feed a third bar segment 27 which extends between the wire-guiding device 40 and the template 10. In other words, all the wire-guiding devices 40 coupled to the bars 20 of the groups G1 and G2 are positioned, preferably by simultaneously moving all the wire-guiding devices 40, each along the respective bar 20 so as to define a plurality of third bar segments 27. In particular, in the example, twelve bar segments 27 are defined. In accordance with an embodiment, the segments 27 are straight segments, i.e., without bends. In accordance with an embodiment, during the operation shown in FIGS. 8-9 of positioning the wire-guiding devices 40, the template 10 remains still, i.e., it does not rotate about the axis X.

With reference to FIGS. 10-11, such Figures show an operation immediately following the operation shown in FIGS. 8-9. In particular, FIGS. 10-11 show an operation of shaping:

a plurality of first sections 20C of first connecting portions 20C, 20D of said plurality of connecting portions 20C, 20D; 20F, 20G; where such first connecting portions 20C, 20D belong to the first group of bars G1; and a plurality of first sections 20C of first connecting portions 20C, 20D of said plurality of connecting portions 20C, 20D; 20F, 20G; where such first connecting portions 20C, 20D belong to the second group of bars G2. In accordance with an embodiment, such operation of shaping the first sections 20C of the first connecting portions 20C, 20D of the first and of the second group of bars G1, G2 comprises rotating the template 10 and the locking devices 15 integral therewith about the axis X in the direction R1 and moving the wire-guiding devices 40 coupled to the bars 20 of the first group G1 and the wire-guiding devices coupled to the bars 20 of the second group G2 with movements interpolated with the rotation of the template 10. In accordance with an embodiment, in such operation of shaping the sections 20C, all the wire-guiding devices 40 are synchronized with one another so as to allow to simultaneously shape such sections 20C. In the example, twelve sections 20C are simultaneously shaped. In accordance with an embodiment, each section 20C corresponds to about half of a first connecting portion 20C, 20D.

With reference to FIGS. 12-13, such Figures show an operation immediately following the operation described above with reference to FIGS. 11-12. In particular, FIGS. 12-13 show an operation of positioning each wire-guiding device 40 coupled to the bars 20 of the first group G1 along the respective bar 20 so as to define or feed a fourth bar segment 28 which extends between the wire-guiding device 40 and the template 10. In other words, the wire-guiding devices 40 coupled to the bars 20 of the group G1 are positioned, preferably by simultaneously moving all the wire-guiding devices 40 coupled to the bars of the group G1, each along the respective bar 20 so as to define or feed a plurality of fourth bar segments 28. In particular, in the example, six bar segments 28 are defined or fed. In accordance with an embodiment, the segments 28 are straight segments, i.e., without bends. In accordance with an embodiment, during the operation shown in FIGS. 12-13 of positioning the wire-guiding devices 40, the template 10 remains still, i.e., it does not rotate about the axis X. It should be noted that in the operation shown in FIGS. 12-13 the wire-guiding devices 40 coupled to the bars 20 of the second group G2 assume an inoperative configuration. In other words, as it will be better clarified further on, starting from the operation shown in FIGS. 12-13, such wire-guiding devices 40 remain still with respect to the wire-guiding devices 40 coupled to the bars of the first group G1 until the completion of a predetermined portion of the winding 4.

With reference to FIGS. 14-15, such Figures show an operation immediately following the operation described above with reference to FIGS. 12-13. In particular, FIGS. 14-15 show an operation of shaping a plurality of second sections 20D of the first connecting portions 20C, 20D of said plurality of connecting portions 20C, 20D; 20F, 20G. In particular, such sections 20D belong to the bars of the first group of bars G1. In accordance with an embodiment, such operation of shaping the second sections 20D comprises rotating the template 10 and the locking devices 15 integral therewith about the axis X in the direction R1 and moving the wire-guiding devices 40 coupled to the bars 20 of the first group G1 with movements interpolated with the rotation of the template 10. In accordance with an embodiment, in such operation of shaping the second sections 20D, the wire-guiding devices 40 coupled to the bars of the first group G1 are synchronized with one another so as to allow to simultaneously shape such second sections 20D. In the example, six sections 20D are simultaneously shaped. In accordance with an embodiment, each section 20C corresponds to about half of a first connecting portion 20C, 20D of the first group of bars G1. It should be noted that in the operation shown in FIGS. 14-15 the wire-guiding devices 40 coupled to the bars 20 of the second group G2 still assume the aforesaid inoperative configuration.

Figures 16, 17:
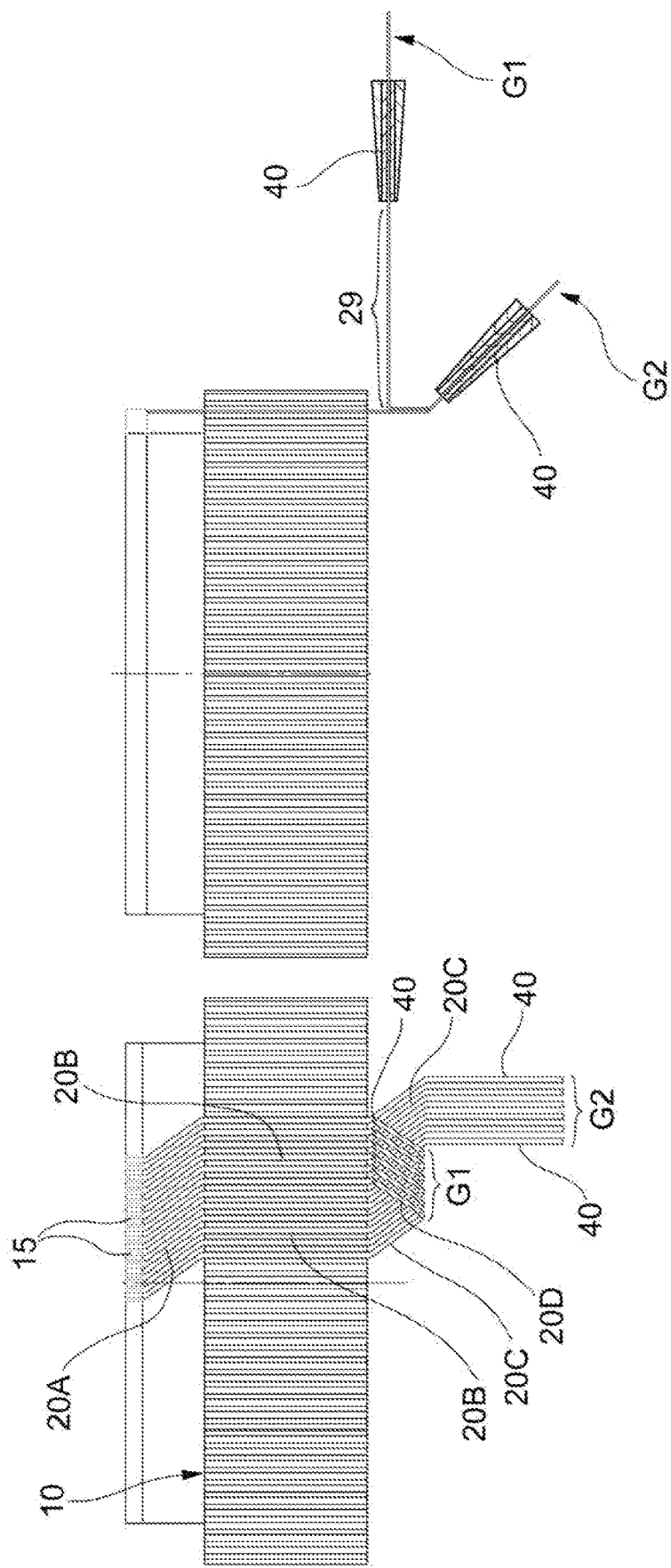

With reference to FIGS. 16-17, such Figures show an operation immediately following the operation described above with reference to FIGS. 14-15. In particular, FIGS. 16-17 show an operation of positioning each wire-guiding device 40 coupled to the bars 20 of the first group G1 along the respective bar 20 so as to define or feed a fifth bar segment 29 which extends between the wire-guiding device 40 and the template 10. In other words, the wire-guiding devices 40 coupled to the bars 20 of the group G1 are positioned, preferably by simultaneously moving all the wire-guiding devices 40 coupled to the bars of the group G1, each along the respective bar 20 so as to define or feed a plurality of fifth bar segments 29. In particular, in the example, six bar segments 29 are defined or fed. In accordance with an embodiment, the segments 29 are straight segments, i.e., without bends. In accordance with an embodiment, during the operation shown in FIGS. 16-17 of positioning the wire-guiding devices 40, the template 10 remains still, i.e., it does not rotate about the axis X. It should be noted that in the operation shown in FIGS. 16-17 the wire-guiding devices 40 coupled to the bars 20 of the second group G2 assume the aforesaid inoperative configuration.

With reference to FIGS. 18-19, such Figures show an operation immediately following the operation described above with reference to FIGS. 16-17. In particular, FIGS. 18-19 show an operation of inserting the second bar portions 20E of the first group G1 of bars into respective second slots 11 of the second group of slots S2 in which the first bar portions 20B of the second group G2 of bars have been inserted. Such second portions 20E are inserted in particular through the third open faces 11C of the second slots 11 of the second group of slots S2. In accordance with an embodiment, such operation of inserting the second bar portions 20E of the first group of bars G1 into the second slots 11 of the second group of slots S2 is performed by simultaneously inserting such second bar portions 20E into the second slots 11 of the second group of slots S2. In accordance with an embodiment, for performing such operation, the wire-guiding devices 40 coupled to the bars 20 of the first group G1 pass from a position located on the side P2 of the template 10, axially beyond the second open end faces 11B of the slots 11, to a position located on the side P1 of the template 10, axially beyond the first open end faces 11A of the slots 11 (FIG. 7). In accordance with an embodiment, during such insertion operation, the wire-guiding devices 40 coupled to the bars 20 of the first group G1 move integrally with the respective conductive bars 20. In other words, during such insertion operation no relative sliding is there between the wire-guiding devices 40 and the respective conductive bars 20. In accordance with an embodiment, during such insertion operation, the template 10 remains still, i.e., it does not rotate about the axis X. Furthermore, during such operation, the wire-guiding devices 40 coupled to the bars 20 of the second group G2 assume the aforesaid inoperative configuration.

Figure 21:
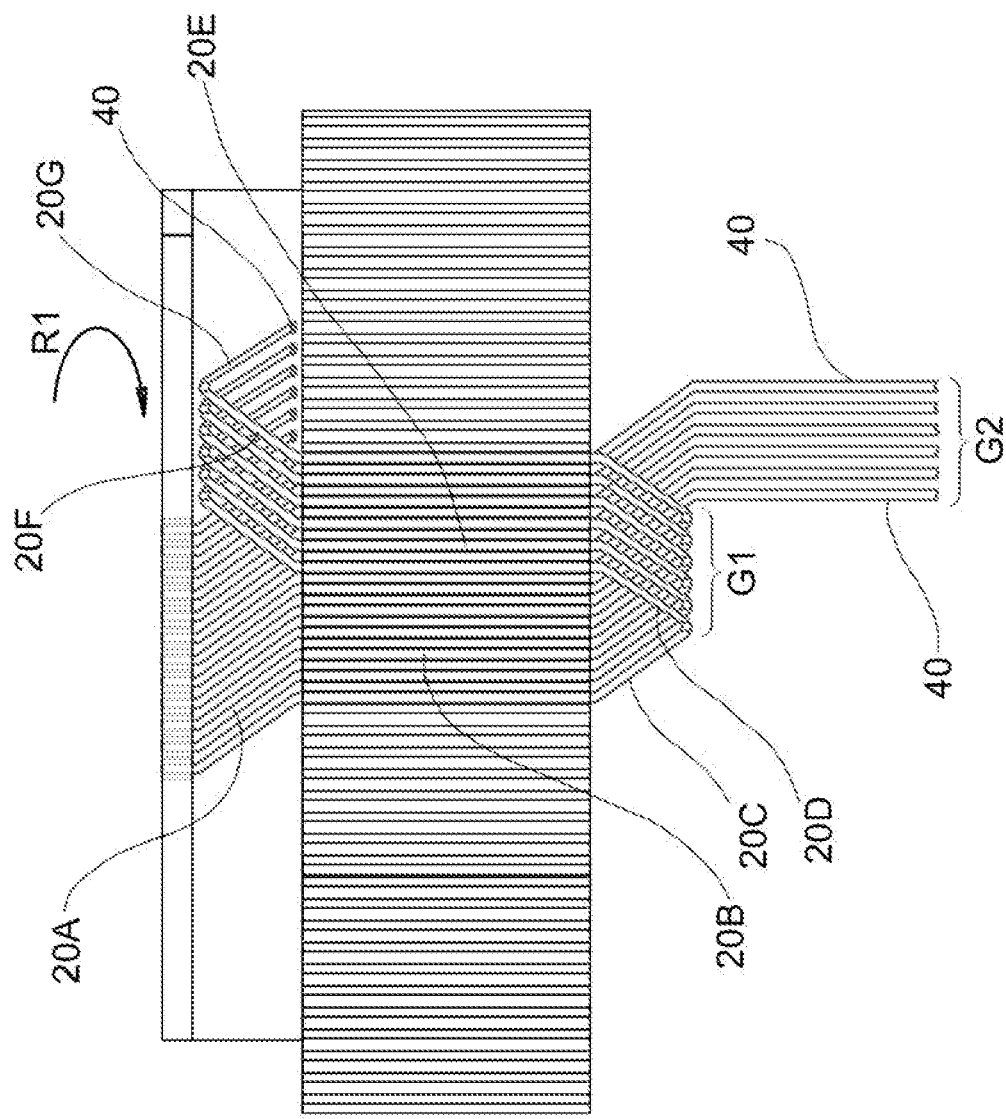

With reference to FIGS. 20-21, such Figures show an operation following the operation described above with reference to FIGS. 18-19. In particular, FIGS. 20-21 show an operation of shaping a plurality of second connecting portions 20F, 20G, in the example, six connecting portions 20F, 20G, of the aforesaid plurality of connecting portions. As it may be noted in FIG. 20, in accordance with an embodiment, the second connecting portions 20F, 20G are shaped one at a time, i.e., not simultaneously, but one after the other.

In other words, the wire-guiding devices 40 coupled to the bars 20 of the first group G1 are moved one at a time to shape the second connecting portions 20F, 20G. In accordance with an embodiment, each connecting portion 20F, 20G is shaped by shaping first a first section 20F of the second connecting portion 20F, 20G and subsequently a second section 20G of the second connecting portion 20F, 20G. In particular, during the shaping of the first section 20F of one of the second connecting portions 20F, 20G, the template 10 rotates in the direction R1 about the axis X and the wire-guiding device 40 coupled to the bar 20 of the group G1 to be shaped is moved with a movement interpolated with the rotation of the template 10. Similarly, during the shaping of the second section 20G of one of the second connecting portions 20F, 20G, the template 10 rotates in the direction R1 about the axis X and the wire-guiding device 40 coupled to the bar 20 of the group G1 to be shaped is moved with a movement interpolated with the rotation of the template 10. From what has been described above, it is clear that, before shaping the first section 20F and the second section 20G respectively, respective operations are provided of positioning the wire-guiding device 40 coupled to the bar 20 to be shaped so as to define bar segments to be processed, similarly to what has been described above with reference to the first connecting portions 20C, 20D (FIG. 9 and FIG. 13). In general, for purposes of brevity of the description, from now onwards, the operations of feeding the bar segments will no longer be described. It is however clear that, before each operation of shaping a section of one of said connecting portions, an operation of feeding a segment of bar 20 is provided, similar, for example, to the operation of feeding the bar segment 27. Furthermore, it is clear that, before each operation of inserting one of the aforesaid bar portions into a respective slot 11, an operation of feeding a bar segment is provided, similar to the operation of feeding the bar segment 26. FIG. 21 shows all the second connecting portions 20F, 20G of the first group of bars G1 once completed. It should be noted that during the operation of shaping such second connecting portions 20F, 20G, the wire-guiding devices 40 coupled to the bars 20 of the second group G2 remain in the aforesaid inoperative configuration.

Figure 22:
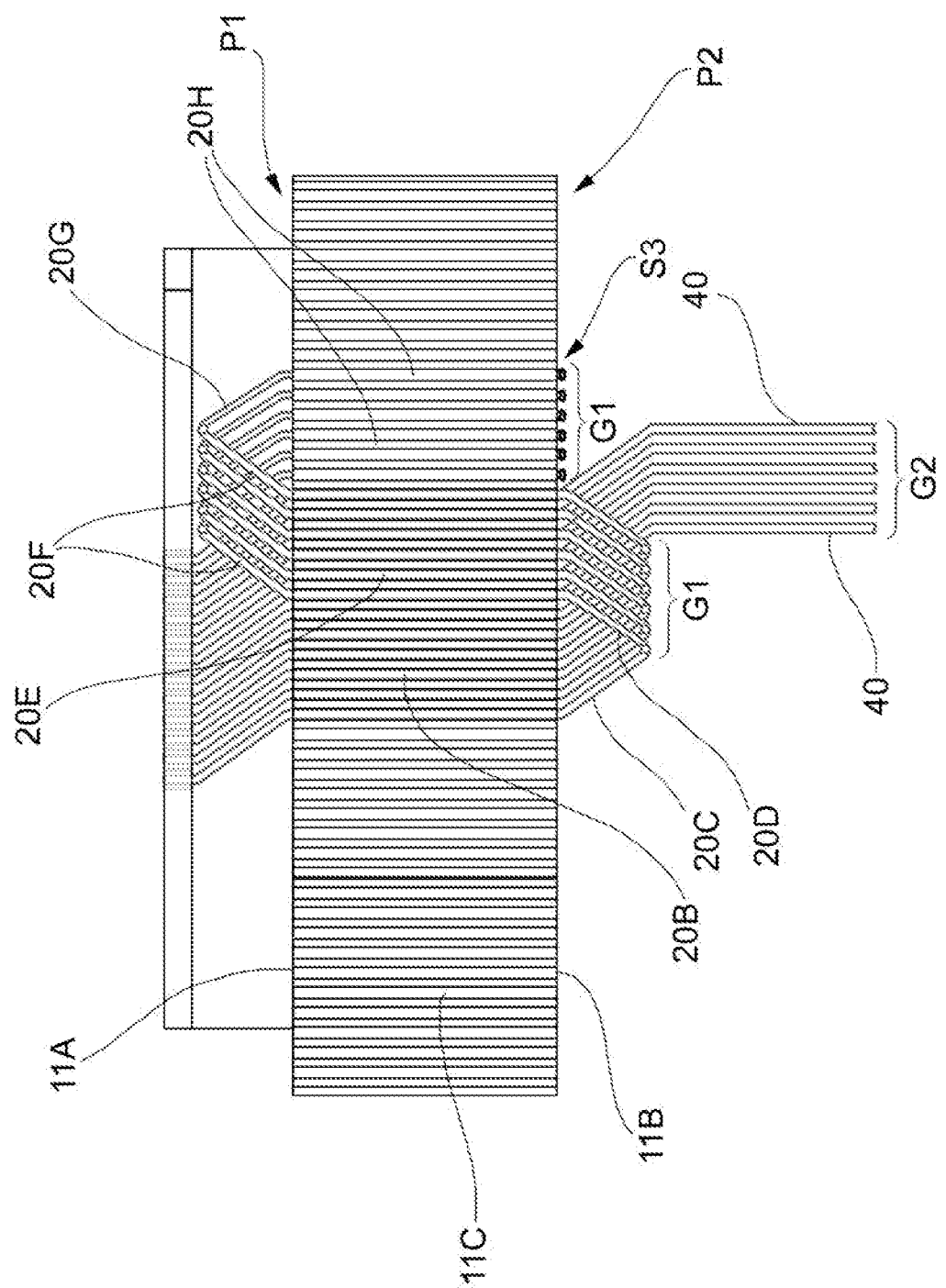

With reference to FIG. 22, such Figure shows an operation following the operation described with reference to FIGS. 20-21. In particular, FIG. 22 shows an operation of inserting third bar portions 20H of the first group G1 of bars into respective third slots 11 of the third group of slots S3. Such third portions 20H are inserted in particular through the third open faces 11C of the third slots 11 of the third group of slots S3. In accordance with an embodiment, such operation of inserting the third bar portions 20H of the first group of bars G1 into the slots 11 of the third group of slots S3 is performed by simultaneously inserting such third bar portions 20H into the slots 11 of the third group of slots S3. In accordance with an embodiment, for performing such operation, the wire-guiding devices 40 coupled to the bars 20 of the first group G1 pass from a position located on the side P1 of the template 10, axially beyond the first open end faces 11A of the slots 11, to a position located on the side P2 of the template 10, axially beyond the second open end faces 11B of the slots 11. In accordance with an embodiment, during such insertion operation, the wire-guiding devices 40 coupled to the bars 20 of the first group G1 move integrally with the respective conductive bars 20. In other words, during such insertion operation no relative sliding is there between the wire-guiding devices 40 and the respective conductive bars 20. In accordance with an embodiment, during such insertion operation, the template 10 remains still, i.e., it does not rotate about the axis X. Furthermore, during such operation, the wire-guiding devices 40 coupled to the bars 20 of the second group G2 assume the aforesaid inoperative configuration.

Figure 23:
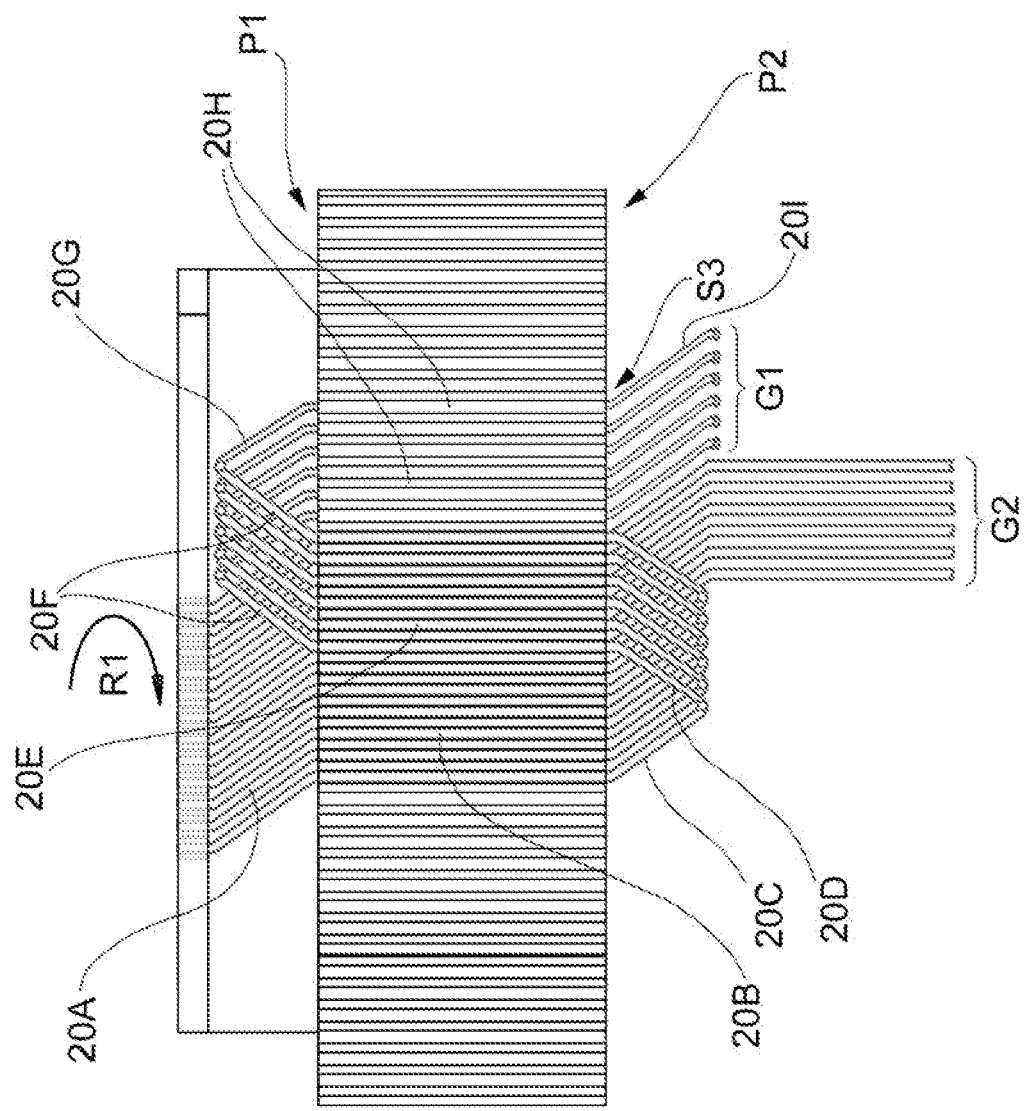

With reference to FIG. 23, such Figure shows an operation following the operation described with reference to FIG. 22. In particular, FIG. 23 shows an operation of shaping a plurality of first sections 20I of third connecting portions (the second sections of such third connecting portions are not shown in the accompanying Figures) of said plurality of connecting portions 20C, 20D; 20F, 20G; 20I; where such third connecting portions belong to the first group of bars G1. In accordance with an embodiment, such operation of shaping the first sections 20I of the third connecting portions of the first group of bars G1 comprises rotating the template 10 and the locking devices 15 integral therewith about the axis X in the direction R1 and moving the wire-guiding devices 40 coupled to the bars 20 of the first group G1 with movements interpolated with the rotation of the template 10. In accordance with an embodiment, in such operation of shaping the first sections 20I, the wire-guiding devices 40 coupled to the bars 20 of the first group G1 are synchronized with one another so as to allow to simultaneously shape such sections 20I. In the example, six sections 20I are simultaneously shaped. In accordance with an embodiment, each section 20I corresponds to about half of a third connecting portion of the first group of bars G1. Once the first sections 20I have been shaped, the wire-guiding devices 40 coupled to the bars of the first group G1 assume a respective inoperative configuration. In other words, as it will be better clarified further on, following the shaping of the sections 20I, the process starts again, moving the wire-guiding devices 40 coupled to the bars of the second group G2, while the wire-guiding devices 40 coupled to the bars of the first group G1 remain still with respect to the wire-guiding devices 40 coupled to the bars of the second group G2 until completing a further predetermined portion of the winding 4.

Figure 24:
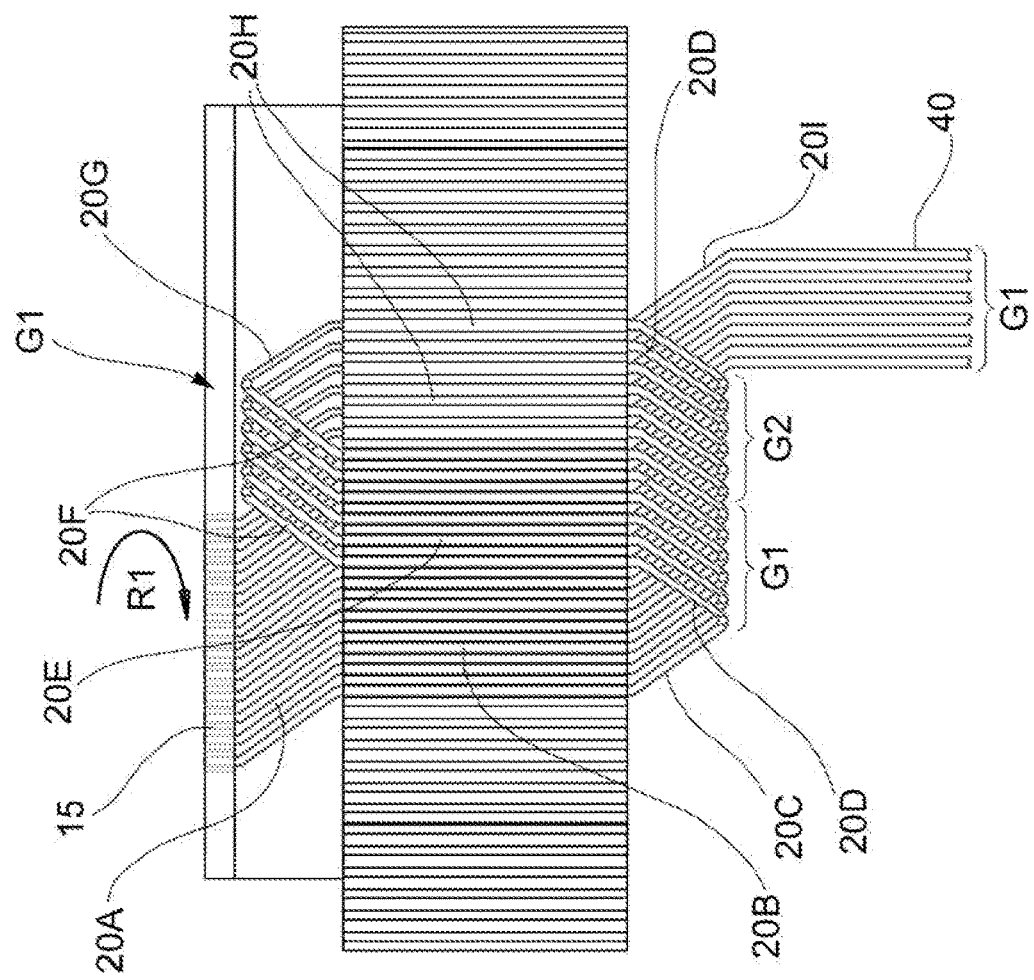

With reference to FIG. 24, such Figure shows an operation following the operation described with reference to FIG. 23. In particular, FIG. 24 shows an operation of shaping a plurality of second sections 20D of the first connecting portions 20C, 20D of said plurality of connecting portions 20C, 20D; 20F, 20G. In particular, such sections 20D belong to the bars of the second group of bars G2. In accordance with an embodiment, such operation of shaping the second sections 20D comprises rotating the template 10 and the locking devices 15 integral therewith about the axis X in the direction R1 and moving the wire-guiding devices 40 coupled to the bars 20 of the second group G2 with movements interpolated with the rotation of the template 10. In accordance with an embodiment, in such operation of shaping the second sections 20D, the wire-guiding devices 40 coupled to the bars of the second group G2 are synchronized with one another so as to allow to simultaneously shape such second sections 20D. In the example, six sections 20D are simultaneously shaped. In accordance with an embodiment, each section 20D corresponds to about half of a first connecting portion 20C, 20D of the second group of bars G1. It should be noted that in the operation shown in FIG. 24, the wire-guiding devices 40 coupled to the bars 20 of the first group G1 still assume the aforesaid inoperative configuration.

Figure 25:
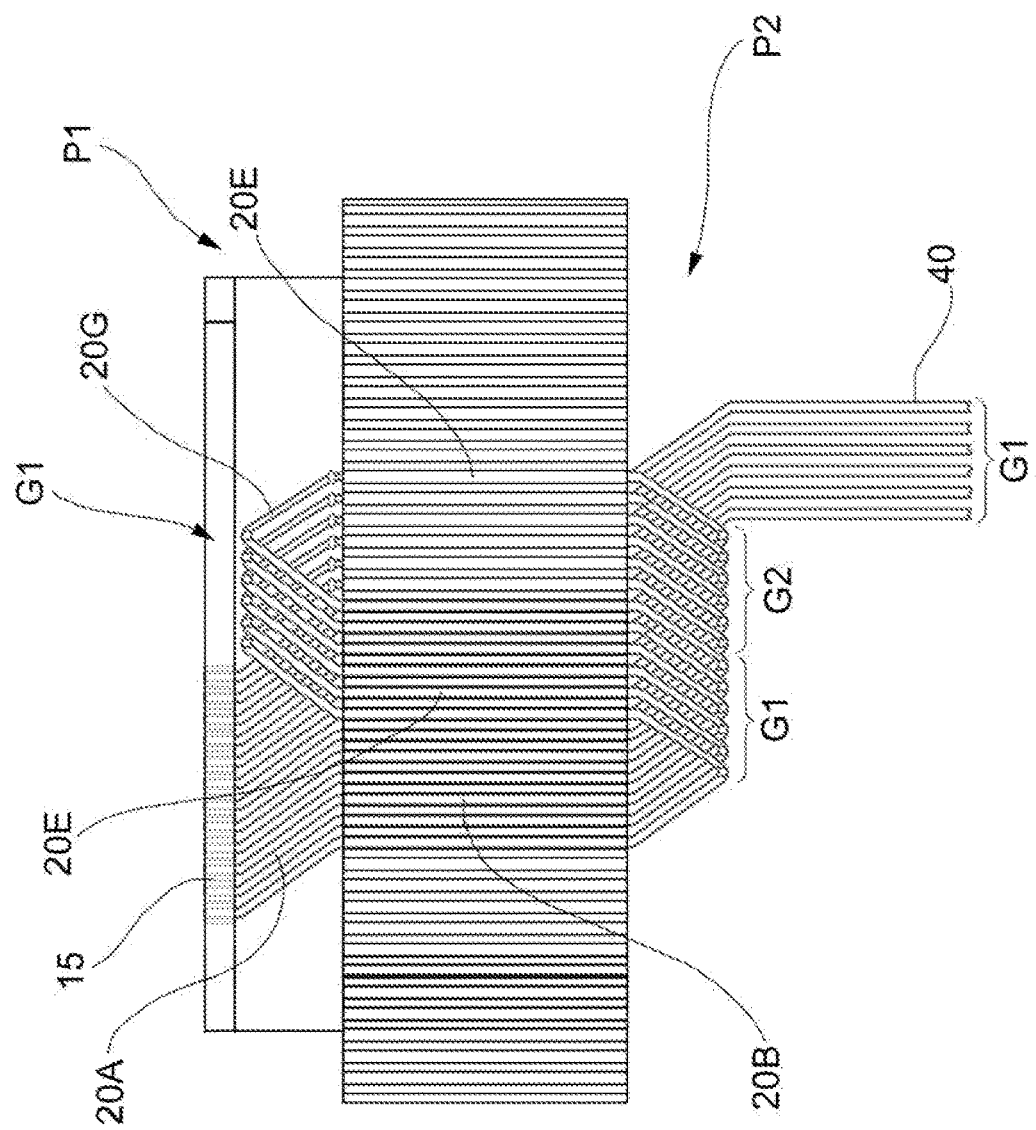

With reference to FIG. 25, such Figure shows an operation following the operation described with reference to FIG. 24. In particular, FIG. 25 shows an operation of inserting second bar portions 20E of the second group G2 of bars into respective slots 11 of the third group of slots S3 in which the third bar portions 20H of the first group G1 of bars have been inserted. Such second portions 20E of the second group of bars G2 are inserted in particular through the third open faces 11C of the slots 11 of the third group of slots S3. In accordance with an embodiment, such operation of inserting the second bar portions 20E of the second group of bars G2 into the slots 11 of the third group of slots S3 is performed by simultaneously inserting such second bar portions 20E into the slots 11 of the third group of slots S3. In accordance with an embodiment, for performing such operation, the wire-guiding devices 40 coupled to the bars 20 of the second group G2 pass from a position located on the side P2 of the template 10, axially beyond the second open end faces 11B of the slots 11, to a position located on the side P1 of the template 10, axially beyond the first open end faces 11A of the slots 11. In accordance with an embodiment, during such insertion operation, the wire-guiding devices 40 coupled to the bars 20 of the second group G2 move integrally with the respective conductive bars 20. In other words, during such insertion operation no relative sliding is there between the wire-guiding devices 40 and the respective conductive bars 20. In accordance with an embodiment, during such insertion operation, the template 10 remains still, i.e., it does not rotate about the axis X. Furthermore, during such operation, the wire-guiding devices 40 coupled to the bars 20 of the first group G1 assume the aforesaid inoperative configuration.

Figure 26:
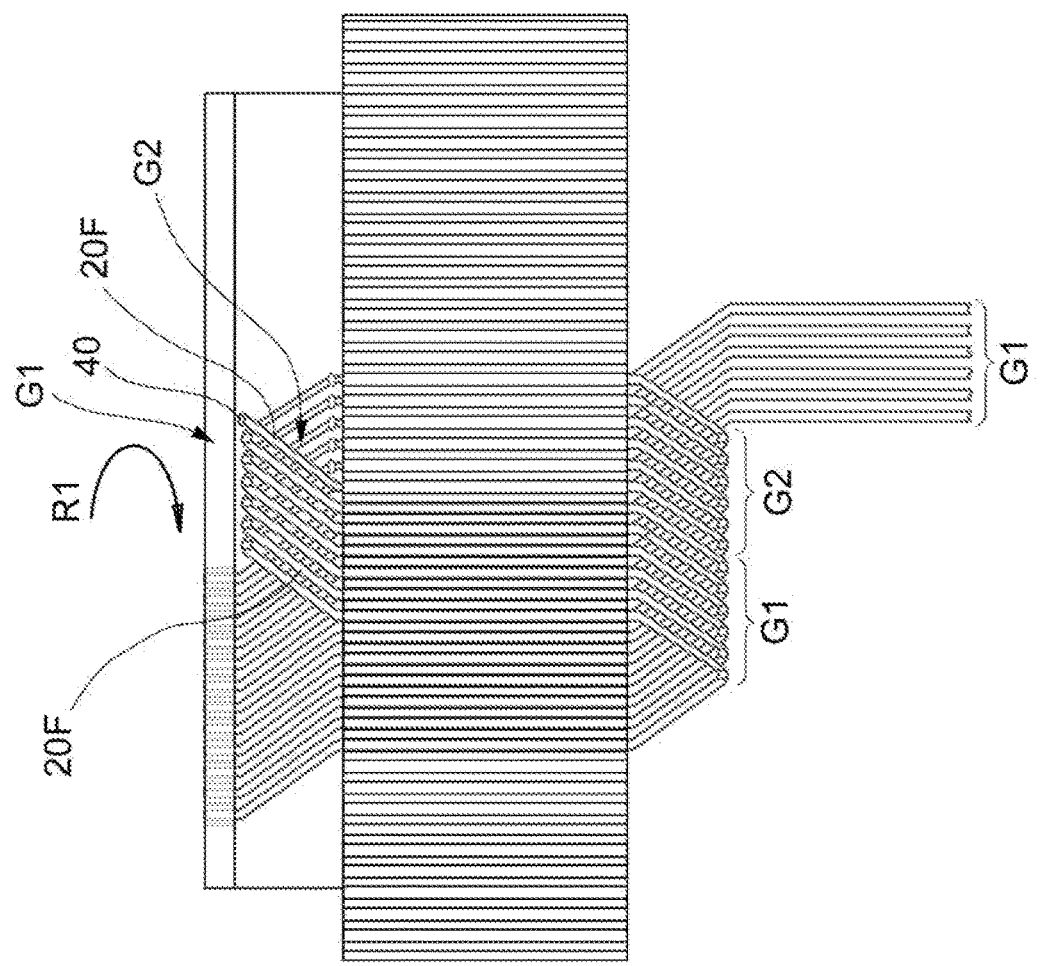
Figure 27:
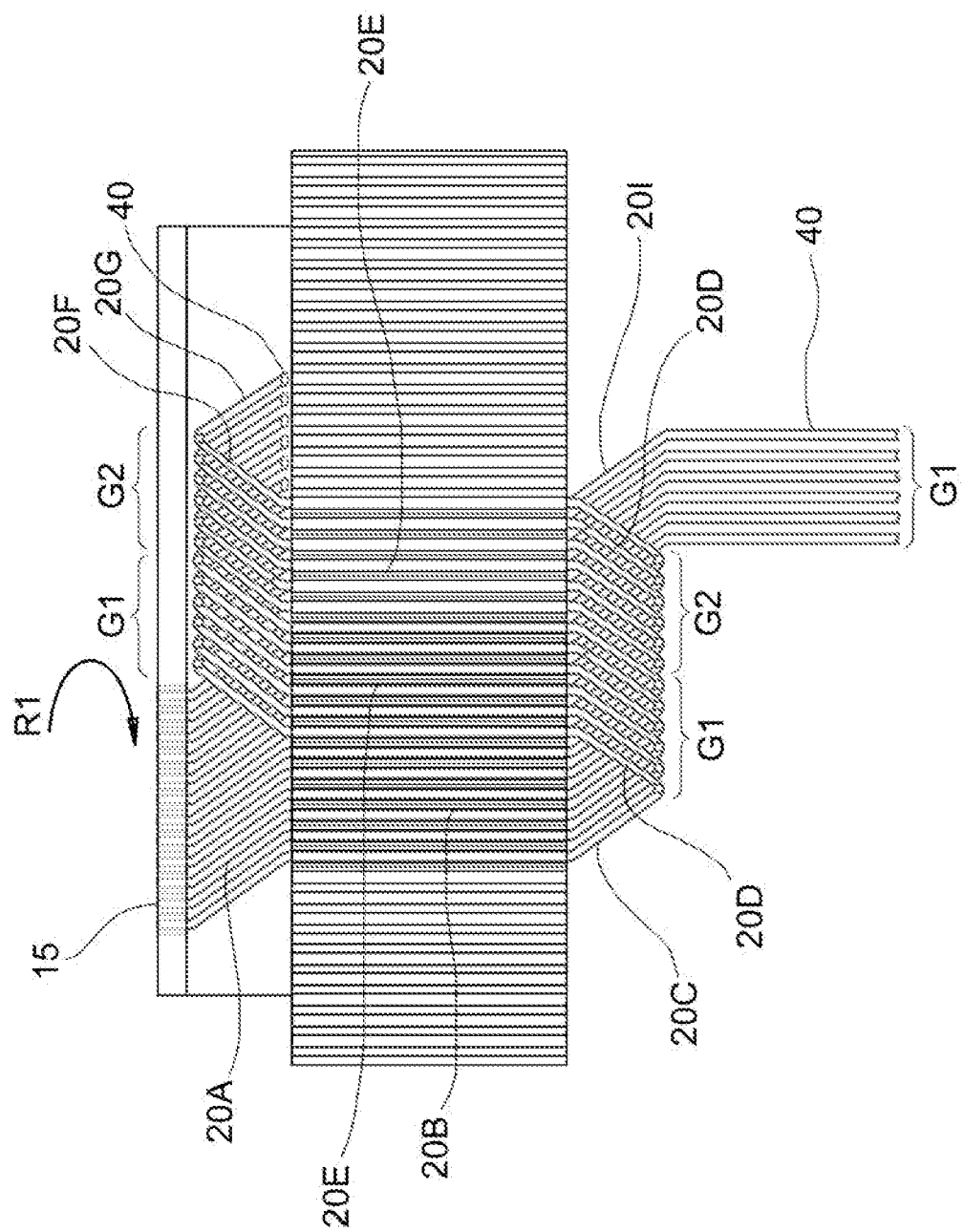

With reference to FIGS. 26-27, such Figures show an operation following the operation described above with reference to FIG. 25. In particular, FIGS. 26-27 show an operation of shaping a plurality of second connecting portions 20F, 20G, in the example, six connecting portions 20F, 20G, of the aforesaid plurality of connecting portions 20C, 20D; 20F, 20G. In particular, such second connecting portions 20F, 20G are portions of the bars 20 of the second group G2. As it may be noted in FIG. 26, in accordance with an embodiment, the second connecting portions 20F, 20G of the second group of bars G2 are shaped one at a time, i.e., not simultaneously, but one after the other. In other words, the wire-guiding devices 40 coupled to the bars 20 of the second group G2 are moved one at a time to shape the second connecting portions 20F, 20G. In accordance with an embodiment, each connecting portion 20F, 20G is shaped by shaping first a first section 20F of the second connecting portion 20F, 20G and subsequently a second section 20G of the second connecting portion 20F, 20G. In particular, during the shaping of the first section 20F of one of the second connecting portions 20F, 20G, the template 10 rotates in the direction R1 about the axis X and the wire-guiding device 40 coupled to the bar 20 to be shaped of the second group G2 is moved with a movement interpolated with the rotation of the template 10. Similarly, during the shaping of the second section 20G of one of the second connecting portions 20F, 20G, the template 10 rotates in the direction R1 about the axis X and the wire-guiding device 40 coupled to the bar 20 to be shaped of the second group G2 is moved with a movement interpolated with the rotation of the template 10. FIG. 27 shows all the second connecting portions 20F, 20G completed of the second group of bars G2. It should be noted that during the operation of shaping such second connecting portions 20F, 20G, the wire-guiding devices 40 coupled to the bars 20 of the first group G1 remain in the aforesaid inoperative configuration.

Figure 28:
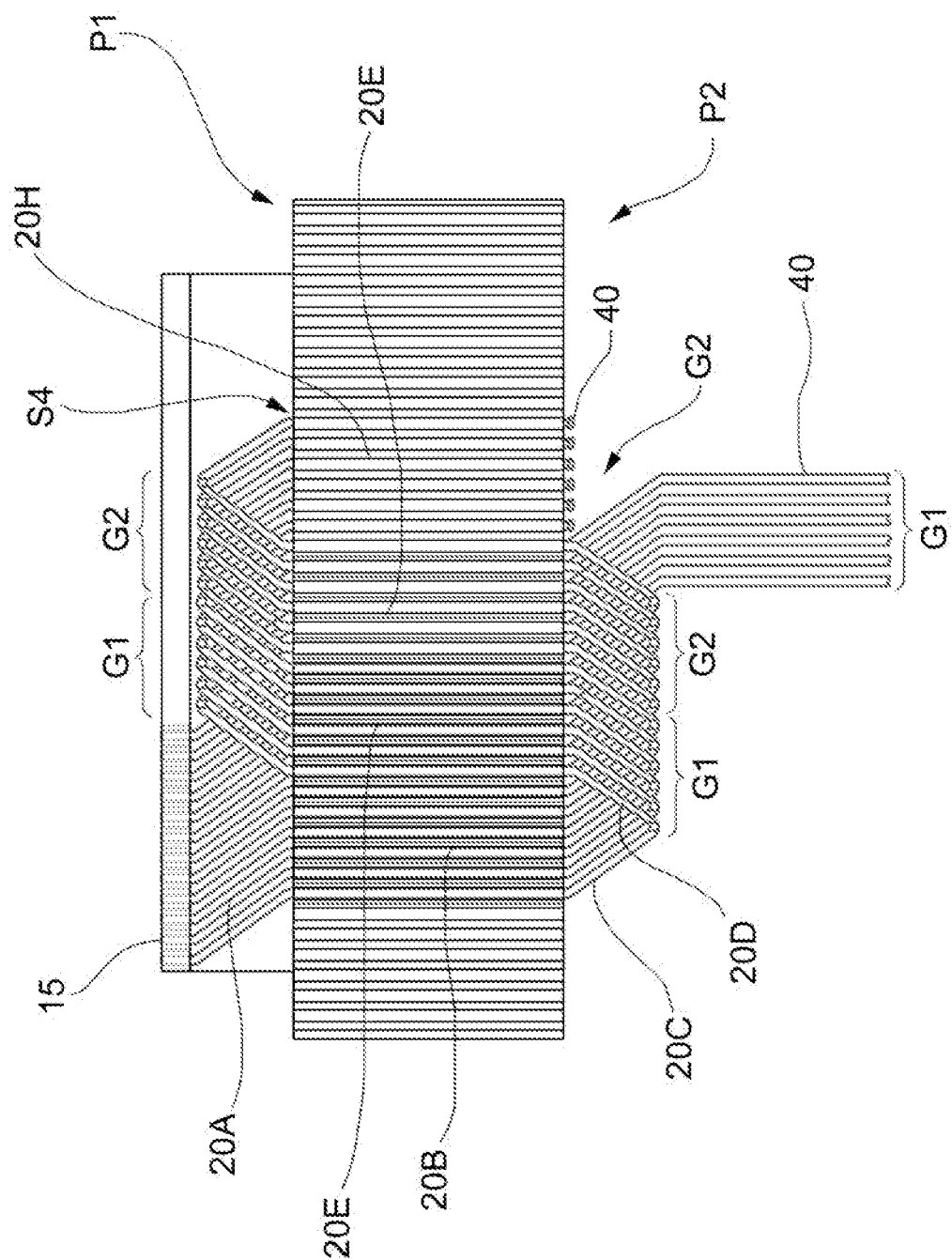

With reference to FIG. 28, such Figure shows an operation following the operation described with reference to FIG. 27. In particular, FIG. 28 shows an operation of inserting third bar portions 20H of the second group G2 of bars into respective slots 11 of a fourth group of slots S4 of said circular array of slots 11. The group S4 is adjacent to the group S3 and has a number of slots equal to the number of bars 20 of each of the groups G1, G2 of bars. The third portions 20H of the bars 20 of the second group of bars G2 are inserted in particular through the third open faces 11C of the slots 11 of the fourth group of slots S4. In accordance with an embodiment, such operation of inserting the third bar portions 20H of the second group of bars G2 into the slots 11 of the group of slots S4 is performed by simultaneously inserting such third bar portions 20H into the slots 11 of the fourth group of slots S4. In accordance with an embodiment, for performing such operation, the wire-guiding devices 40 coupled to the bars 20 of the second group G2 pass from a position located on the side P1 of the template 10, axially beyond the first open end faces 11A of the slots 11, to a position located on the side P2 of the template 10, axially beyond the second open end faces 11B of the slots 11. In accordance with an embodiment, during such insertion operation, the wire-guiding devices 40 coupled to the bars 20 of the second group G2 move integrally with the respective conductive bars 20. In other words, during such insertion operation no relative sliding is there between the wire-guiding devices 40 and the respective conductive bars 20. In accordance with an embodiment, during such insertion operation, the template 10 remains still, i.e., it does not rotate about the axis X. Furthermore, during such operation, the wire-guiding devices 40 coupled to the bars 20 of the first group G1 assume the aforesaid inoperative configuration.

Figure 29:
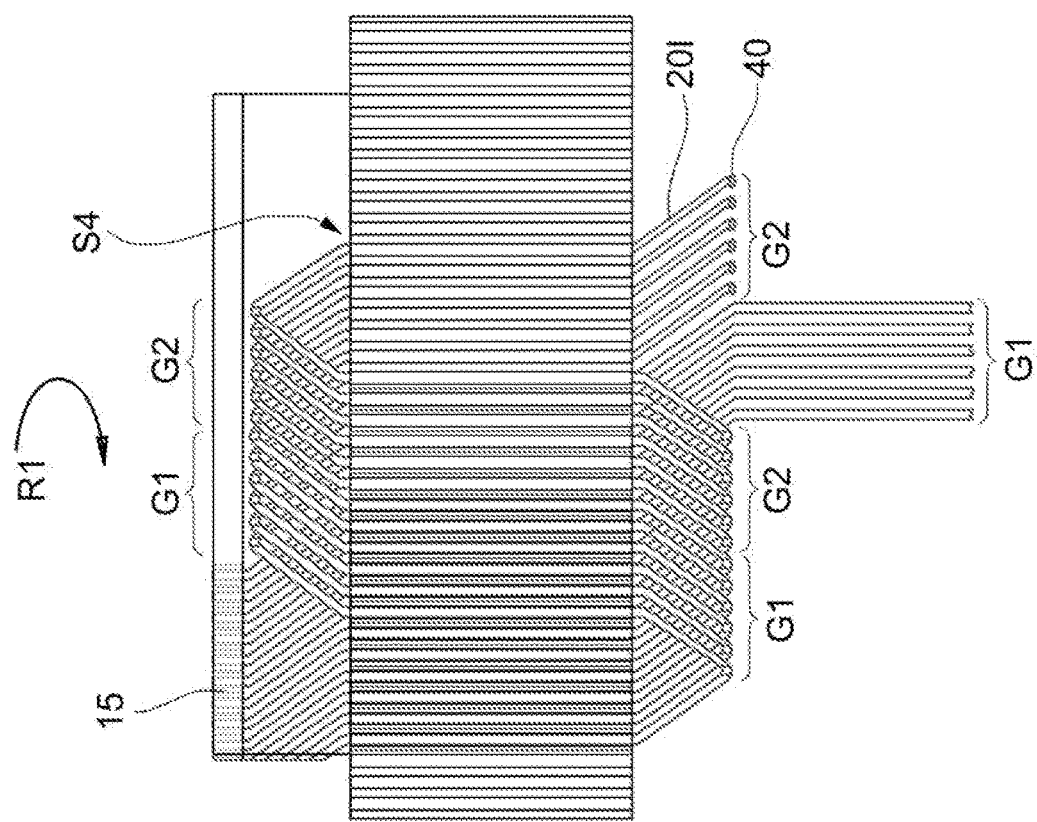

With reference to FIG. 29, such Figure shows an operation following the operation described with reference to FIG. 28. In particular, FIG. 29 shows an operation of shaping a plurality of first sections 20I of third connecting portions (the second sections of such third connecting portions are not shown in the accompanying Figures) of said plurality of connecting portions 20C, 20D; 20F, 20G; 20I; where such third connecting portions belong to the second group of bars G2. In accordance with an embodiment, such operation of shaping the first sections 20I of the third connecting portions of the second group of bars G2 comprises rotating the template 10 and the locking devices 15 integral therewith about the axis X in the direction R1 and moving the wire-guiding devices 40 coupled to the bars 20 of the second group G2 with movements interpolated with the rotation of the template 10. In accordance with an embodiment, in such operation of shaping the first sections 20I, the wire-guiding devices 40 coupled to the bars 20 of the second group G2 are synchronized with one another so as to allow to simultaneously shape such sections 20I. In the example, six sections 20I are simultaneously shaped. In accordance with an embodiment, each section 20I corresponds to about half of a third connecting portion of the second group of bars G2. Once the first sections 20I have been shaped, the wire-guiding devices 40 coupled to the bars of the second group G2 assume again the respective inoperative configuration. In other words, following the shaping of the sections 20I of the second group of bars G2, the process starts again, moving the wire-guiding devices 40 coupled to the bars of the first group G1, while the wire-guiding devices 40 coupled to the bars of the second group G2 remain still with respect to the wire-guiding devices 40 coupled to the bars of the first group G1 until completing a further predetermined portion of the winding 4.

Starting from the configuration of FIG. 29, to complete the winding 4, the bars of the first and of the second group G1, G2 are shaped and inserted into the slots 11 of the aforesaid circular array of slots, repeating operations similar to the ones described with reference to the Figures from FIG. 12 to FIG. 29, but in further groups of slots 11 adjacent to one another so as to complete at least one complete revolution about the template 10, i.e., so that each slot 11 of the aforesaid circular array receives at least two of the aforesaid bar portions respectively belonging to the first and to the second group of bars G1, G2. In accordance with an embodiment, to make the winding 4, the bars of the first and of the second group G1, G2 are shaped around the template 10 so as to complete a plurality of turns around the template 10, for example three turns around the template 10. Once the shaping of the bars of the first and of the second group G1, G2 around the template 10 has been completed, the latter are sheared.

Figure 30:
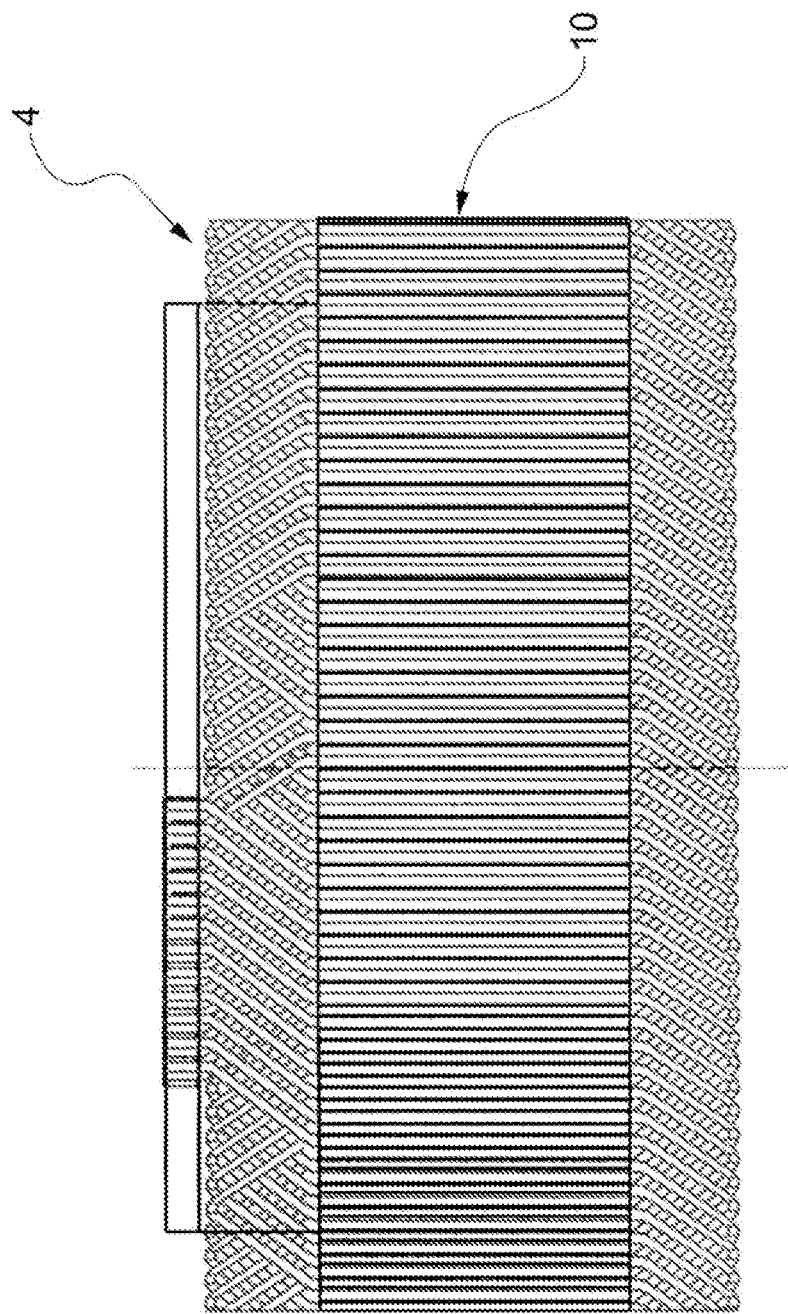
FIG. 30 is a front and diagrammatic plane view of the winding of FIG. 1 wound around a template.

FIG. 30 shows the complete winding 4 wound around the template 10. In this regard, it should be noted that, in accordance with an embodiment, the template 10 may be a rotor core. In such case, at the end of a process according to the present description, a rotor provided with the relative winding is directly made. In the case in which the winding 4 is to be inserted into the stator core 2 to make a stator 1, as in the example of FIG. 1, this may be performed, for example, in a manner per se known by means of a radial expansion of the winding into the slots 3 of the stator core, providing the template 10 with special radial expansion devices.

It should be noted that a process according to the present invention is not limited to the process described above and that numerous amendments and/or variants may be made to the process described above.

For example, it should be noted that, in general, it is not strictly necessary for the template 10 to be configured to rotate about the axis X and/or for the locking devices 15 to be rotatably integral with the template 10. In accordance with an embodiment, in general, it is sufficient for a relative movement between the wire-guiding devices 40 and the template 10 to be there. However, the fact that the template 10 may rotate about the axis X advantageously allows for a more compact system for the realization of the winding. Furthermore, the fact of including locking devices 15 rotatably integral with the template 10 advantageously allows for the template 10 to contribute to the formation and the containment of the winding.

In accordance with an embodiment, it is sufficient for the wire-guiding devices 40 to be provided with at least two degrees of freedom.

In accordance with an embodiment, a process according to the present description comprises providing at least one conductive bar 20 for each step of the winding to be made.

In accordance with an embodiment, the movements of the wire-guiding devices 40, and more preferably the movements of the wire-guiding devices 40 and of the template 10, are interpolated so as to feed the respective bars 20, insert such bars into the slots 11 of the template 10 and preferably shape the bars 20 according to a predefined winding scheme.

In accordance with an embodiment, the scheme of the winding to be made, the number of bars 20 per phase and per rotor/stator slot, and the number of phases of the winding to be made defines the number of wire-guiding devices 40 to be employed to realize a process according to the present description. Thereby, the winding scheme determines the movements and the synchronization at least of the wire-guiding devices 40, and more preferably of the wire-guiding devices 40 and of the template 10. In accordance with an embodiment, being free to move and rotate in space, the wire-guiding devices 40 may work in synchrony with one another.

Generalizing what has been described above, in practice, a process for realizing a continuous bar winding (4) for an electric machine has also been described in general, comprising:

a) a step of providing a template (10) having a template axis (X) and a circular array of slots (11) extended about said template axis (X), said circular array of slots having a number of slots equal to a number of slots of the stator or of the rotor of said electric machine, each slot (11) of said circular array having a first and a second open end face (11A, 11B) which are axially spaced from one another and a third open end face (11C), said third face (11C) being a longitudinal face extended between said first and second end faces (11A, 11B)

b) a step of providing a conductive bar (20);

c) a step of locking a locking portion (21) of said conductive bar;

d) a step of inserting the conductive bar (20) into the slots (11) of said array and shaping the conductive bar (20) so that such conductive bar (20) repeatedly passes through the slots (11) of said array from the side of the first open end faces (11A) to the side of the second open end faces (11B) and vice versa, so that said bar (20) has a plurality of bar portions (20B, 20E, 20H) received in the slots (11) of said array and a plurality of connecting portions (20C, 20D; 20F, 20G) projecting beyond said first and second open end faces (11A, 11B), each of said connecting portions joining a pair of said bar portions (20B, 20E, 20H) received in the slots (11) of said array;

in which said step d) comprises:

d1) an operation of inserting a first bar portion (20B) of said plurality of bar portions into a respective slot (11) of said circular array of slots (11) through said third face (11C) of such slot (11);

d2) an operation of shaping a first connecting portion (20C, 20D) of said plurality of connecting portions (20C, 20D; 20F, 20G);

d3) an operation of inserting a second bar portion (20E) of said plurality of bar portions (20B, 20E, 20H) into a further slot (11) of said array, distinct from the slot (11) into which said first bar portion (20B) has been inserted, through said third face (11C) of the further slot (11);

in which said first connecting portion (20C, 20D) joins said first and second bar portions (20B, 20E) projecting beyond the second end faces (11B) of the slots (11) in which said first and second bar portions (20B, 20E) have been inserted.

In accordance with an embodiment of the process, said conductive bar (20) is a rectangular bar conductor.

In accordance with an embodiment the process comprises:

e) a step of providing a wire-guiding device (40) coupled to said conductive bar (20) so as to allow a relative movement between the wire-guiding device (40) and the conductive bar (20);

said wire-guiding device (40) being provided with a plurality of degrees of freedom, said wire-guiding device (40) being employed at least for guiding the insertion of said plurality of bar portions (20B, 20E, 20H) into the slots (11) of said array during said step d).

In accordance with an embodiment of the process, said wire-guiding device (40) is slidably coupled to the conductive bar (40).

In accordance with an embodiment of the process, said wire-guiding device (40) is movable with respect to the conductive bar (20) to define a plurality of conductive bar segments (23, 26-29) to be processed during said step d).

Advantageously, feeding in this manner a plurality of conductive bar segments to be processed allows to facilitate the forming process of the winding (4).

In accordance with an embodiment of the process, said wire-guiding device (40) is equipped with six degrees of freedom.

In accordance with an embodiment of the process, said wire-guiding device (40) comprises a cavity (41) which is countershaped or substantially countershaped with respect to the conductive bar (20) and in which said conductive bar (20) passes through said cavity (41).

In accordance with an embodiment of the process, said conductive bar (20) is partially wound on a winding device (30).

In accordance with an embodiment of the process
said step b) comprises providing a plurality of conductive bars (20),
said step c) comprises locking said locking portion (21) of each bar (20) of said plurality of bars (20),
said step d) comprises inserting each bar (20) of said plurality of conductive bars (20) into the slots (11) of said array and shaping each conductive bar (20) of said plurality of conductive bars (20) so that each of such conductive bars (20) repeatedly passes through the slots (11) of said array from the side of the first open end faces (11A) to the side of the second open end faces (11B) and vice versa, so that each of said bars (20) has a plurality of bar portions (20B, 20E, 20H) received in the slots (11) of said array and a plurality of connecting portions (20C, 20D; 20F, 20G) projecting beyond said first and second open end faces (11A, 11B), each of said connecting portions joining a pair of said bar portions (20B, 20E, 20H) received in the slots (11) of said array;
said step d) comprises, for each bar (20) of said plurality of bars (20), said operation d1), said operation d2) and said operation d3).
said step e) comprises providing a plurality of wire-guiding devices (40) which can be operated independently from one another, each of said wire-guiding devices (40) being coupled to a respective conductive bar (20) of said plurality of conductive bars (20), each of said wire-guiding devices (40) being provided with a plurality of degrees of freedom, each of said wire-guiding devices (40) being employed at least to guide the insertion of said plurality of bar portions (20B, 20E, 20H) of each of said bars into the slots (11) of said array during said step d).

In accordance with an advantageous embodiment of the process, since it allows both to limit the number of weldings required for making the winding and to make the winding in a particularly versatile manner, since it allows, for example and not by way of limitation, to have a particular flexibility when varying the size of the winding heads:
the conductive bars (20) of said plurality of conductive bars (20) each comprise said first (20B) and second (20E) bar portions and a third (20H) bar portion, said plurality of bars (20) comprising a first (G1) and a second (G2) group of bars each having a same number of conductive bars (20);
said array of slots (11) comprises a first, a second, and a third group (S1, S2, S3) of slots which are distinct from, and circumferentially adjacent to one another, each of such groups of slots (S1, S2, S3) including a same number of slots which are circumferentially adjacent to one another, each of such groups of slots (S1, S2, S3) having a number of slots equal to the number of bars (20) of said first and second group of bars (G1, G2);
in which the operation d1) comprises inserting the first bar portions (20B) of the first group (G1) of bars each into a respective slot of the first group of slots (S1) by means of the third open faces (11C) of such slots;
in which said step d) further comprises:
d1.1) an operation of inserting the first bar portions (20B) of the second group (G2) of bars each into a respective slot of the second group of slots (S2) through the third open faces (11C) of such slots;
in which the step d2) comprises shaping a plurality of first connecting portions (20C, 20D) of said plurality of connecting portions (20C, 20D; 20F, 20G), such first connecting portions (20C, 20D) belonging to the first group of bars (G1);
in which step d3) comprises inserting the second bar portions (20E) of the first group (G1) of bars into respective slots (11) of the second group of slots (S2) through the third open faces (11C) of such slots, the first bar portions (20B) of the second group (G2) of bars having been inserted into the second group of slots (S2);
in which step d) comprises:
d4) an operation of shaping a plurality of second connecting portions (20F, 20G) of said plurality of connecting portions, such second connecting portions belonging to the first group of bars (G1);
d5) an operation of inserting the third bar portions (20H) of the first group of bars (G1) each into a respective slot (11) of the third group of slots (S3) through said third faces (11C) of such slots;
in which said process comprises shaping a plurality of first connecting portions (20C, 20C) of said plurality of connecting portions, such first connecting portions belonging to the second group of bars (G2);
in which said process comprises inserting the second bar portions (20E) of the second group (G2) of bars each into a respective slot of the third group of slots (S3) through said third open faces (11C) of such slots, the third bar portions (20H) of the first group of bars (G1) having been inserted into the third group of slots (S3);
in which each of said first connecting portions (20C, 20D) of the first group of bars (G1) joins the first and second bar portions (20B, 20E) of a bar of the first group (G1) of bars projecting beyond the second open end faces (11B) of said slots (11);
in which each of said second connecting portions (20F, 20G) of the first group of bars (G1) joins the second and third bar portions (20E, 20H) of a bar of the first group (G1) of bars projecting beyond the first open end faces (11A) of said slots (11);
in which each of said first connecting portions (200, 20D) of the second group of bars (G2) joins the first and second bar portions (20B, 20E) of a bar of the second group (G2) of bars projecting beyond the second open end faces (11B) of said slots.

On the basis of what has been described above, it is therefore possible to understand how a process of the type described above allows to achieve the aforementioned objects with reference to the background art.

A process according to the present description, in fact, allows the continuous shaping of a continuous bar winding around a template, which may also directly consist of a stator core or a rotor core. Thereby, it is therefore possible to make in a versatile manner types of windings different from one another. Furthermore, a process according to the description does not require the employment of a "flexible" or "segmented" stator core of the background art.

Without prejudice to the principle of the invention, the embodiments and embodiment details may be widely varied with respect to what has been described and shown purely by way of non-limiting example, without departing from the scope of the invention as defined in the accompanying claims.

The invention claimed is:
1. A process for making a continuous bar winding (4) for an electric machine, comprising:
   a) a step of providing a template (10) having a template axis (X) and a circular array of slots (11) extended about said template axis (X), said circular array of slots having a number of slots equal to a number of slots of the stator or of the rotor of said electric machine, each slot (11) of said circular array having a first and a second open end face (11A, 11B) which are axially spaced from one another and a third open end face (11C), said third face (11C) being a longitudinal face extended between said first and second end faces (11A, 11B)
   b) a step of providing a plurality of conductive bars (20);
   c) a step of locking a locking portion (21) of each bar (20) of said plurality of conductive bars;
   d) a step of inserting each bar (20) of said plurality of conductive bars (20) into the slots (11) of said array and shaping each conductive bar (20) of said plurality of conductive bars (20) so that each of such conductive bars (20) repeatedly passes through the slots (11) of said array from the side of the first open end faces (11A) to the side of the second open end faces (11B) and vice versa, so that each of said bars (20) has a plurality of bar portions (20B, 20E, 20H) received in the slots (11) of said array and a plurality of connecting portions (20C, 20D; 20F, 20G) projecting beyond said first and second open end faces (11A, 11B), each of said connecting portions joining a pair of said bar portions (20B, 20E, 20H) received in the slots (11) of said array;
   wherein said step d) comprises, for each bar of said plurality of bars:
      d1) an operation of inserting a first bar portion (20B) of said plurality of bar portions into a respective slot (11) of said circular array of slots (11) through said third face (11C) of such slot (11);
      d2) an operation of shaping a first connecting portion (20C, 20D) of said plurality of connecting portions (20C, 20D; 20F, 20G);
      d3) an operation of inserting a second bar portion (20E) of said plurality of bar portions (20B, 20E, 20H) into a respective further slot (11) of said array, distinct from the slot (11) into which said first bar portion (20B) has been inserted, through said third face (11C) of the further slot (11);
   e) a step of providing a plurality of wire-guiding devices (40), each of said wire-guiding devices (40) being coupled to a respective conductive bar (20) of said plurality of conductive bars (20) so as to allow a relative movement between the wire-guiding device (40) and the conductive bar (20), each of said wire-guiding devices (40) being employed at least to guide the insertion of said plurality of bar portions (20B, 20E, 20H) of each of said bars into the slots (11) of said array during said step d), each of said wire-guiding devices (40) being provided with a plurality of degrees of freedom;
   wherein said first connecting portion (20C, 20D) joins said first and second bar portions (20B, 20E) projecting beyond the second end faces (11B) of the slots (11) in which said first and second bar portions (20B, 20E) have been inserted;
   wherein the conductive bars (20) of said plurality of conductive bars (20) each comprise said first (20B) and second (20E) bar portions and a third (20H) bar portion, said plurality of bars (20) comprising a first (G1) and a second (G2) group of bars each having a same number of conductive bars (20);
   wherein said array of slots (11) comprises a first, a second, and a third group (S1, S2, S3) of slots which are distinct from, and circumferentially adjacent to one another, each of such groups of slots (S1, S2, S3) including a same number of slots which are circumferentially adjacent to one another, each of such groups of slots (S1, S2, S3) having a number of slots equal to the number of bars (20) of said first and second group of bars (G1, G2);
   wherein the operation d1) comprises inserting the first bar portions (20B) of the first group (G1) of bars each into a respective slot of the first group of slots (S1) by means of the third open faces (11C) of such slots;
   wherein said step d) further comprises:
      d1.1) an operation of inserting the first bar portions (20B) of the second group (G2) of bars each into a respective slot of the second group of slots (S2) through the third open faces of such slots;
   wherein step d2) comprises shaping a plurality of first connecting portions (20C, 20D) of said plurality of connecting portions, such first connecting portions (20C, 20D) belonging to the first group of bars (G1),
   wherein each of said first connecting portions (20C, 20D) of the first group of bars (G1) joins the first and second bar portions (20B, 20E) of a bar of the first group (G1) of bars projecting beyond the second open end faces (11B) of said slots (11);
   wherein said process comprises shaping a plurality of first connecting portions (20C, 20C) of said plurality of connecting portions, such first connecting portions belonging to the second group of bars (G2);
   wherein step d) comprises:
   d4) an operation of shaping a plurality of second connecting portions connecting portions (20F, 20G) of said plurality of connecting portions, such second connecting portions belonging to the first group of bars (G1),
   d5) an operation of inserting the third bar portions (20H) of the first group of bars (G1) each into a respective slot (11) of the third group of slots (S3) through said third faces (11C) of such slots;
   wherein each of said second connecting portions (20F, 20G) of the first group of bars (G1) joins the second and third bar portions (20E, 20H) of a bar of the first group (G1) of bars projecting beyond the first open end faces (11A) of said slots (11);
   wherein each of said first connecting portions (20C, 20D) of the second group of bars (G2) joins the first and second bar portions (20B, 20E) of a bar of the second group (G2) of bars projecting beyond the second open end faces (11B) of said slots;
   said process being characterized in that:
   said wire-guiding devices (40) can be operated independently from one another;
   wherein step d3) comprises inserting the second bar portions (20E) of the first group (G1) of bars into respective slots (11) of the second group of slots (S2)

through the third open faces (11C) of such slots, the first bar portions (20B) of the second group (G2) of bars having been inserted into the second group of slots (S2);

wherein said process comprises inserting the second bar portions (20E) of the second group (G2) of bars each into a respective slot of the third group of slots (S3) through said third open faces (11C) of such slots, the third bar portions (20H) of the first group of bars (G1) having been inserted into the third group of slots (S3);

wherein the second connecting portions (20F, 20G) are shaped one at a time, namely not simultaneously, but one after the other, wherein the wire-guiding devices (40) coupled to the bars (20) of the first group (G1) are moved one at a time to shape the second connecting portions (20F, 20G).

2. The process according to claim 1, wherein said conductive bars (20) are rectangular bar conductors.

3. The process according to claim 2, wherein each of said wire-guiding devices (40) is movable with respect to the respective conductive bar (20) to define a plurality of conductive bar segments (23, 26-29) to be processed during said step d).

4. The process according to claim 2, wherein each of said wire-guiding devices (40) is provided with six degrees of freedom.

5. The process according to claim 2, wherein each of said wire-guiding devices (40) comprises a cavity (41) which is countershaped or substantially countershaped with respect to the respective conductive bar (20) and wherein said conductive bar (20) passes through said cavity (41).

6. The process according to claim 2, wherein each of said conductive bars (20) is partially wound on a winding device (30).

7. The process according to claim 1 or 2, wherein each of said wire-guiding device (40) is slidably coupled to the respective conductive bar (410').

8. The process according to claim 7, wherein each of said wire-guiding devices (40) is movable with respect to the respective conductive bar (20) to define a plurality of conductive bar segments (23, 26-29) to be processed during said step d).

9. The process according to claim 7, wherein each of said wire-guiding devices (40) is provided with six degrees of freedom.

10. The process according to claim 7, wherein each of said wire-guiding devices (40) comprises a cavity (41) which is countershaped or substantially countershaped with respect to the respective conductive bar (20) and wherein said conductive bar (20) passes through said cavity (41).

11. The process according to claim 7, wherein each of said conductive bars (20) is partially wound on a winding device (30).

12. The process according to claim 1, wherein each of said wire-guiding devices (40) is movable with respect to the respective conductive bar (20) to define a plurality of conductive bar segments (23, 26-29) to be processed during said step d).

13. The process according to claim 12, wherein each of said wire-guiding devices (40) is provided with six degrees of freedom.

14. The process according to claim 12, wherein each of said wire-guiding devices (40) comprises a cavity (41) which is countershaped or substantially countershaped with respect to the respective conductive bar (20) and wherein said conductive bar (20) passes through said cavity (41).

15. The process according to claim 12, wherein each of said conductive bars (20) is partially wound on a winding device (30).

16. The process according to claim 1, wherein each of said wire-guiding devices (40) is provided with six degrees of freedom.

17. The process according to claim 16, wherein each of said wire-guiding devices (40) comprises a cavity (41) which is countershaped or substantially countershaped with respect to the respective conductive bar (20) and wherein said conductive bar (20) passes through said cavity (41).

18. The process according to claim 16, wherein each of said conductive bars (20) is partially wound on a winding device (30).

19. The process according to claim 1, wherein each of said wire-guiding devices (40) comprises a cavity (41) which is countershaped or substantially countershaped with respect to the respective conductive bar (20) and wherein said conductive bar (20) passes through said cavity (41).

20. The process according to claim 19, wherein each of said conductive bars (20) is partially wound on a winding device (30).

21. The process according to claim 1, wherein each of said conductive bars (20) is partially wound on a winding device (30).

22. The process according to claim 1, wherein: said step d2) comprises simultaneously shaping said first connecting portions (20C, 20D) of the first group of bars (G1); and said step d4) comprises shaping said second connecting portions (20F, 20G) of the first group of bars (G1) one at a time.

* * * * *